(12) United States Patent
Bronstein et al.

(10) Patent No.: US 8,224,087 B2
(45) Date of Patent: Jul. 17, 2012

(54) METHOD AND APPARATUS FOR VIDEO DIGEST GENERATION

(76) Inventors: Michael Bronstein, Santa Clara, CA (US); Alex Bronstein, Santa Clara, CA (US); Shlomo S. Rakib, Cupertino, CA (US); Asaf Matatyaou, San Carlos, CA (US)

( * ) Notice: Subject to any disclaimer, the term of this patent is extended or adjusted under 35 U.S.C. 154(b) by 1075 days.

(21) Appl. No.: 11/778,633

(22) Filed: Jul. 16, 2007

(65) Prior Publication Data
US 2009/0025039 A1  Jan. 22, 2009

(51) Int. Cl.
*G06K 9/00* (2006.01)

(52) U.S. Cl. .............. 382/170; 382/168; 725/28

(58) Field of Classification Search ............. 382/170; 725/32, 36, 38, 42
See application file for complete search history.

(56) References Cited

U.S. PATENT DOCUMENTS

| | | | |
|---|---|---|---|
| 5,818,439 A | 10/1998 | Nagasaka et al. | |
| 6,597,859 B1 | 7/2003 | Leinhart et al. | |
| 7,035,435 B2 | 4/2006 | Li et al. | |
| 7,047,494 B2 | 5/2006 | Wu et al. | |
| 7,050,110 B1 | 5/2006 | Lienhart et al. | |
| 7,174,029 B2 | 2/2007 | Agostinelli et al. | |
| 7,714,878 B2 * | 5/2010 | Gabay et al. | 345/626 |
| 7,739,307 B2 * | 6/2010 | Probst et al. | 707/796 |
| 8,090,200 B2 * | 1/2012 | Barletta et al. | 382/168 |
| 2002/0157095 A1 | 10/2002 | Masumitsu et al. | |
| 2003/0001846 A1 * | 1/2003 | Davis et al. | 345/474 |
| 2003/0093790 A1 * | 5/2003 | Logan et al. | 725/38 |
| 2004/0003394 A1 * | 1/2004 | Ramaswamy | 725/28 |
| 2005/0192987 A1 * | 9/2005 | Marsh | 707/100 |
| 2005/0232588 A1 | 10/2005 | Hosoda et al. | |
| 2006/0020962 A1 * | 1/2006 | Stark et al. | 725/32 |
| 2006/0239644 A1 | 10/2006 | Barbieri | |
| 2007/0036518 A1 | 2/2007 | Jeong et al. | |
| 2008/0005323 A1 * | 1/2008 | Shinkai et al. | 709/224 |
| 2008/0046917 A1 * | 2/2008 | de Heer | 725/32 |
| 2008/0132337 A1 * | 6/2008 | Lee et al. | 463/42 |
| 2008/0159639 A1 * | 7/2008 | Dvir et al. | 382/236 |
| 2009/0317062 A1 * | 12/2009 | Jung et al. | 386/95 |

OTHER PUBLICATIONS

Feldman, et al., "Motion Segmentation Using an Occlusion Detector", *Proc. Workshop on Dynamical Vision*, 9$^{th}$ European Conference on Computer Vision, May 2006, pp. 1-10.
Lloyd, S.P., "Least Squares Quantization in PCM", *IEEE Trans. on Information Theory*, vol. IT-28, No. 2, Mar. 1982, pp. 129-137.
Max, J., "Quantizing for Minimum Distortion", , *IEEE Trans. Inform. Theory*, pp. 7-12, Mar. 1960.

* cited by examiner

*Primary Examiner* — Gregory M Desire
(74) *Attorney, Agent, or Firm* — Stephen E. Zweig

(57) ABSTRACT

The present invention is a video digest which extracts only the relevant information out of the video content according to user preferences. Video digest generator is a combination of hardware and software constituting a component of the digital video recorder, which analyzes the content and extracts only the portions which are meaningful or important for the user.

86 Claims, 18 Drawing Sheets

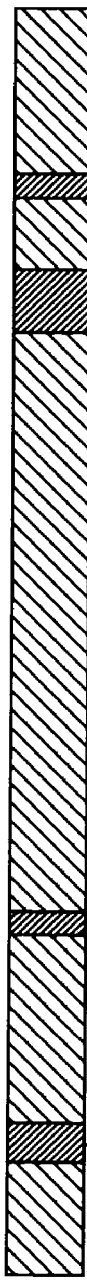
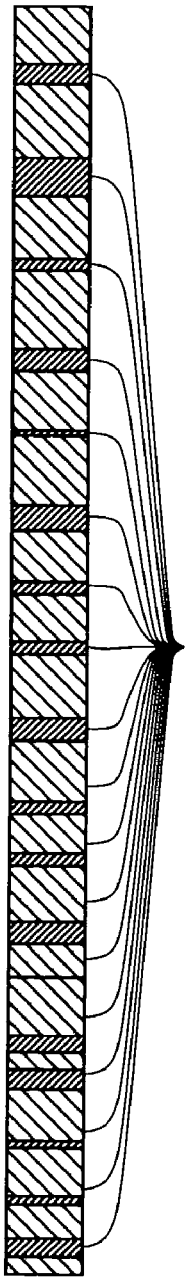
FIG. 15A ABBREVIATION
FIG. 15B SUMMARY
FIG. 15C FAST FORWARD (PREVIEW)
1590

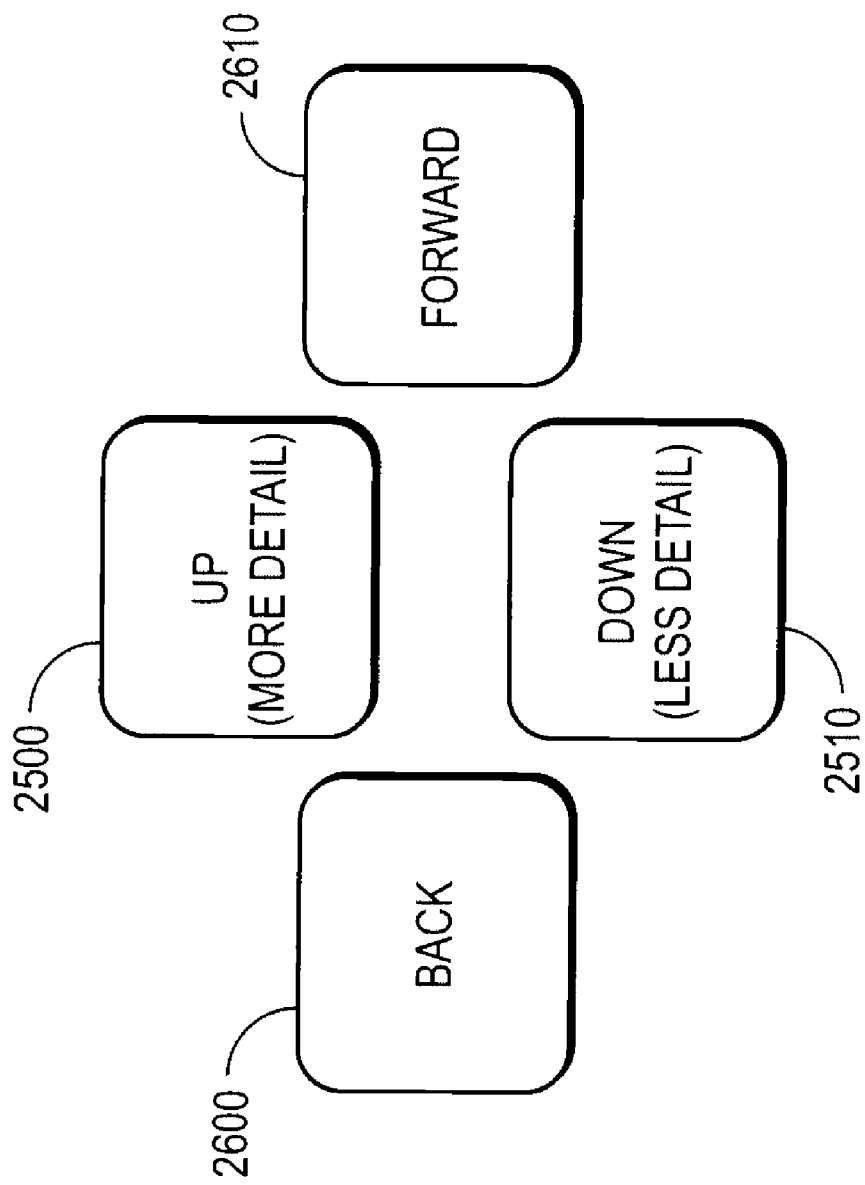

METHOD AND APPARATUS FOR VIDEO DIGEST GENERATION

FIELD OF THE INVENTION

The present invention pertains generally to storing, retrieving and displaying media information. More particularly, the present invention relates to methods and apparatus for processing video and audio content so that undesired content is discarded, and only desired content is retained.

BACKGROUND OF THE INVENTION

Digital video recorders (DVR) allow a convenient and flexible way of storing and retrieving video and audio information accessible to the modern user of media content. Today, the majority of video content is coming from cable or satellite providers, or archived on different media. However, the rapid development of broadband networks will increase the percentage of content coming from the Internet, peer-to-peer sharing, etc. These trends blur the traditional concept of channels and we therefore refer to the possible sources of video as the ocean of content.

Storing and retrieving important content from this ocean is becoming a problem. Given the large choice of content, the user has problems choosing what he wants to see. Assuming that a typical DVR can store hours of video, a typical, modern user who has limited time is unable to see even a small fraction of the data he would like to see. Modern DVRs have some basic capabilities facilitating the preview and retrieval of recorder content, but they are too limited and generic to be convenient.

Viewers of video typically desire the ability to see certain portions of a program that are significant to them (i.e., desired content). It should be understood that for a single content, multiple different video digests can be created, depending upon the definition of desired and undesired content. Since such definitions are subjective, ideally, a video digest is custom-tailored for every user.

Theoretically, desired and undesired content can be given a semantic description. For example, one may wish to see scenes of car crashes and exclude advertisements. "Car crashes" and "advertisements" are semantic labels to the aforementioned classes of video content. Matching of semantic description to video content belongs to the general category of pattern recognition problems, usually referred to as video search. As of today's state of science and technology, there are no unique and reliable ways to relate high-level semantic description to the actual video content. The major distinction between video digest and video search applications is that in video digest, the user does not wish to describe semantically the content he would like or would not like to see, and usually prefers a zero-effort experience, in which no explicit interaction with the system is needed.

SUMMARY OF THE INVENTION

In one aspect, the present invention pertains generally to storing and retrieving video and audio information.

In a more particular aspect, the present invention relates to methods and apparatus for processing media content so that insignificant content is discarded, and only significant content is retained.

The present invention is directed to an overall method and apparatus that can determine numerous different categories of relevancy, which can then be combined in different ways, providing an ability to automatically extract relevant information out of the video content, and use that extracted information to create what is referred to as a video digest.

In another aspect, the present invention provides a method for automated generation of a digest of video content, referred to as metadata, from at least a plurality of at least ten sequential frames (the minimum duration of a noticeably meaningful video content), comprising the steps of inputting the plurality of sequential frames; dividing the input sequential frames into small subsets referred to hereinafter as video elements, ranking them according to their importance, and aggregating them into video aggregates, which are subsequently ranked and selected according to their importance, to obtain the video digest on the input content.

The method of the present invention is related to the general category of partial object similarity problems in pattern recognition, in which similarity or dissimilarity of parts of objects is used to generalize about the similarity of the entire objects. Resorting to a two-dimensional illustration, if human bodies are the objects we wish to detect as desired content in an image, detecting parts of the human body like legs, hands, etc., allows, with a large degree of confidence, to generalize about the entire object. The presence of such parts will be an indication of the presence of the entire object. Though the parts are not necessarily meaningful per se, their aggregate is. The video elements in the presented approach can be regarded as parts of larger-scale objects (video element aggregates), of which the desired content consists.

The importance rating mechanism is the key component of the video digest generation process, and is based on computing the similarity of different video elements. First, self-similarity of the input video may be indication of important events occurring in the video. Secondly, while it is difficult or impossible to match semantic description to video content, it is usually possible to easily obtain examples of content that the user likes or dislikes. By computing the similarity to a set of such examples, it is possible to rate the importance of video elements in accordance with the user preferences.

The choice of the specific criterion of similarity (or equivalently, dissimilarity) determines the level of semantic information captured by such a process. Considering the example of human faces, we can use a similarity criterion which allows distinguishing between faces and non-faces. The semantic granularity of such a criterion is high, since the only information it provides is whether the object is a face or not. Different similarity criteria can be used. A different criterion distinguishing between male and female faces has a lower semantic granularity, as it conveys more information. Finally, a criterion distinguishing between faces of different people has an even lower level of semantic granularity. The choice of the similarity criteria is guided by two factors: the semantic granularity level and computational complexity. Typically, criteria with lower granularity are also more computationally intensive.

Other aspects are included, such as further including the step of presenting the generated video digest to the end user. In a sense, the output produced by the video digest can be regarded as metadata, which can be then used to display the desired content to the user. The latter can be performed in numerous manners, depending on the use scenarios.

BRIEF DESCRIPTION OF THE DRAWINGS

FIG. 15A-C shows significant content portions using video digest with different methods.

FIG. 17B illustrates a user interface for hierarchical navigation through video.

DETAILED DESCRIPTION OF THE PREFERRED EMBODIMENTS

Figure 1:
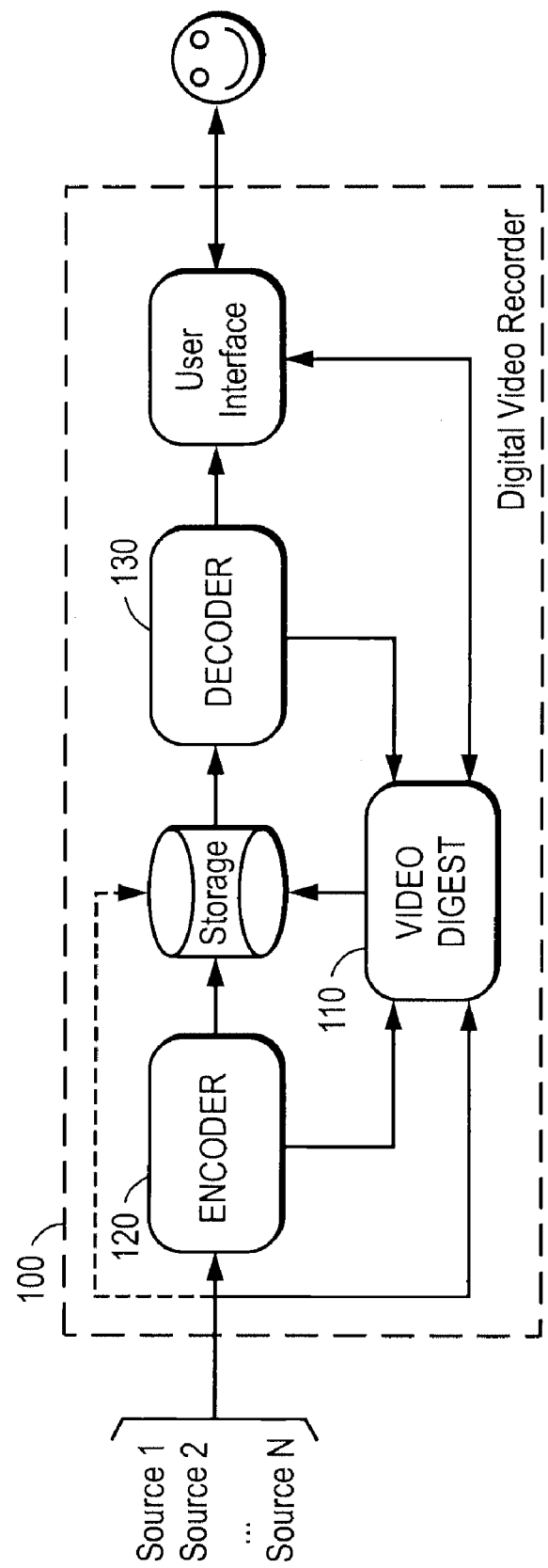
FIG. 1 is a conceptual block diagram of a DVR integrated with a video digest.

From a system point of view, the present invention contains a combination of hardware and software, which can be, in a particular embodiment, a subsystem within a DVR, which analyzes the content and extracts only the portions which are meaningful or important for the user. This combination of hardware and software is illustrated in FIG. 1 as a video digest generator 110, and is shown integrated into a DVR 100. The video digest generator 110 can be included as a component of the encoding 120/decoding 130 engine that exists in almost all DVRs, and can also operate when coupled with a DVR. It can also be used independent of a DVR, as will be shown herein.

The entire or portions of the video processing required for the digest generation can rely upon the information produced by the video codec and performed during the video encoding or transcoding process (while the content is being stored in the DVR) or during the video decoding process (while the stored content is being played). This has an advantage in terms of computational complexity, since some computationally-intensive processes that are anyway performed during video encoding or decoding can be thus reused for the purpose of video digest generation, avoiding redundant computations. As an example, it is possible to use the motion field information obtained by the video encoder during the video digest generation.

Video Digest Generation Process

Figure 2:
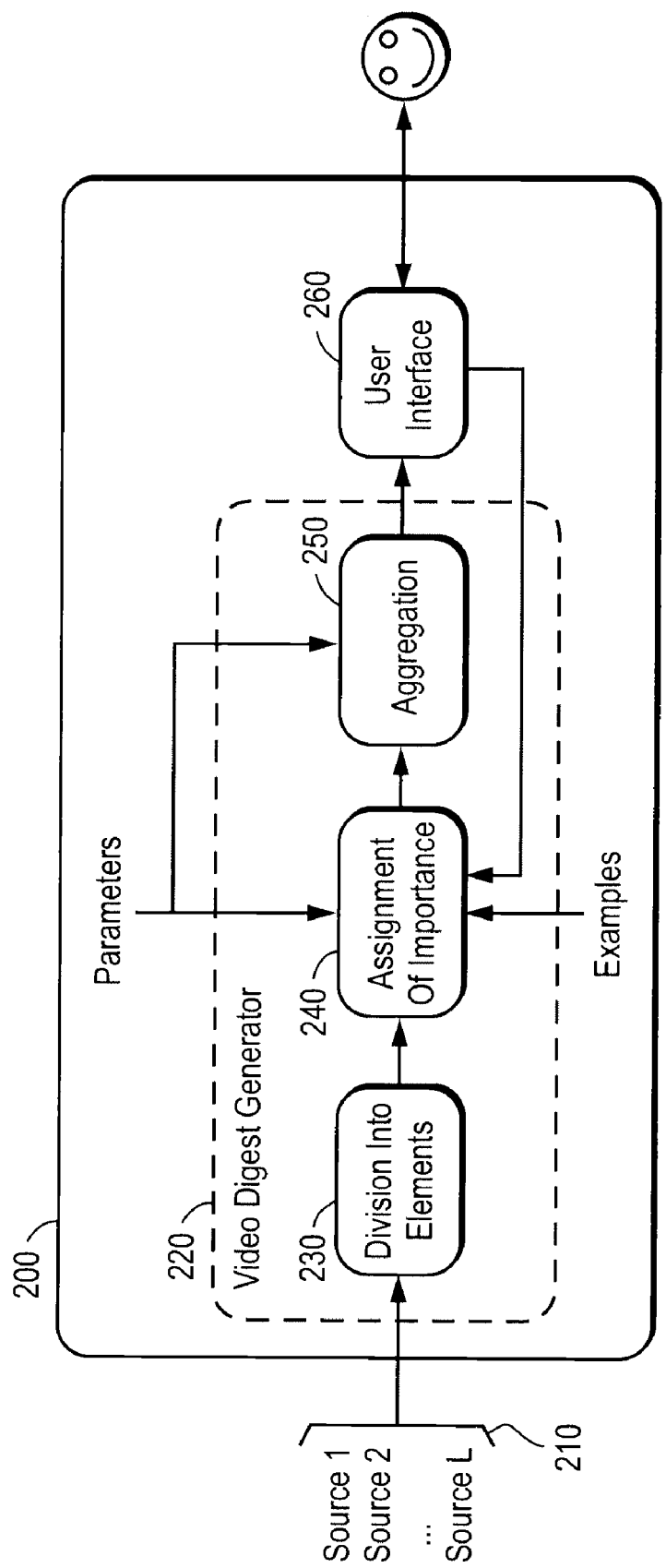
FIG. 2 is a conceptual block diagram of video digest generator.

The video digest generator is designed to automatically process video contents and generate metadata to obtain video digest. In FIG. 2, system 200 shows the main stages of the video digest generation process. The input 210 automatically fed into a video digest generator 220 is a single or multiple video sequences. In the following discussion, without loss of generality, the case of single input is described, though the generalization to multiple inputs is straightforward and should be readily apparent to those of ordinary skill in the art, and should be included in the spirit of the present invention. As a matter of notation, the video is denoted by I(x,y,t), where x, y are the horizontal and vertical spatial coordinates, and t is the temporal coordinate. For a fixed value of t, I(x,y,t) can be thought of as a two-dimensional matrix of pixels, referred to as frame. Spatial coordinates refer to the position within the frame. Temporal coordinate refers to the time axis, i.e., the number of the frame in the sequence.

The video digest generation process consists of the following stages: division into video elements stage 230, assignment of importance rating stage 240, aggregation into video aggregates stage 250. The operation of these stages depends on the interaction with the user, through the user interface 260.

Division into Video Elements

Figure 3:
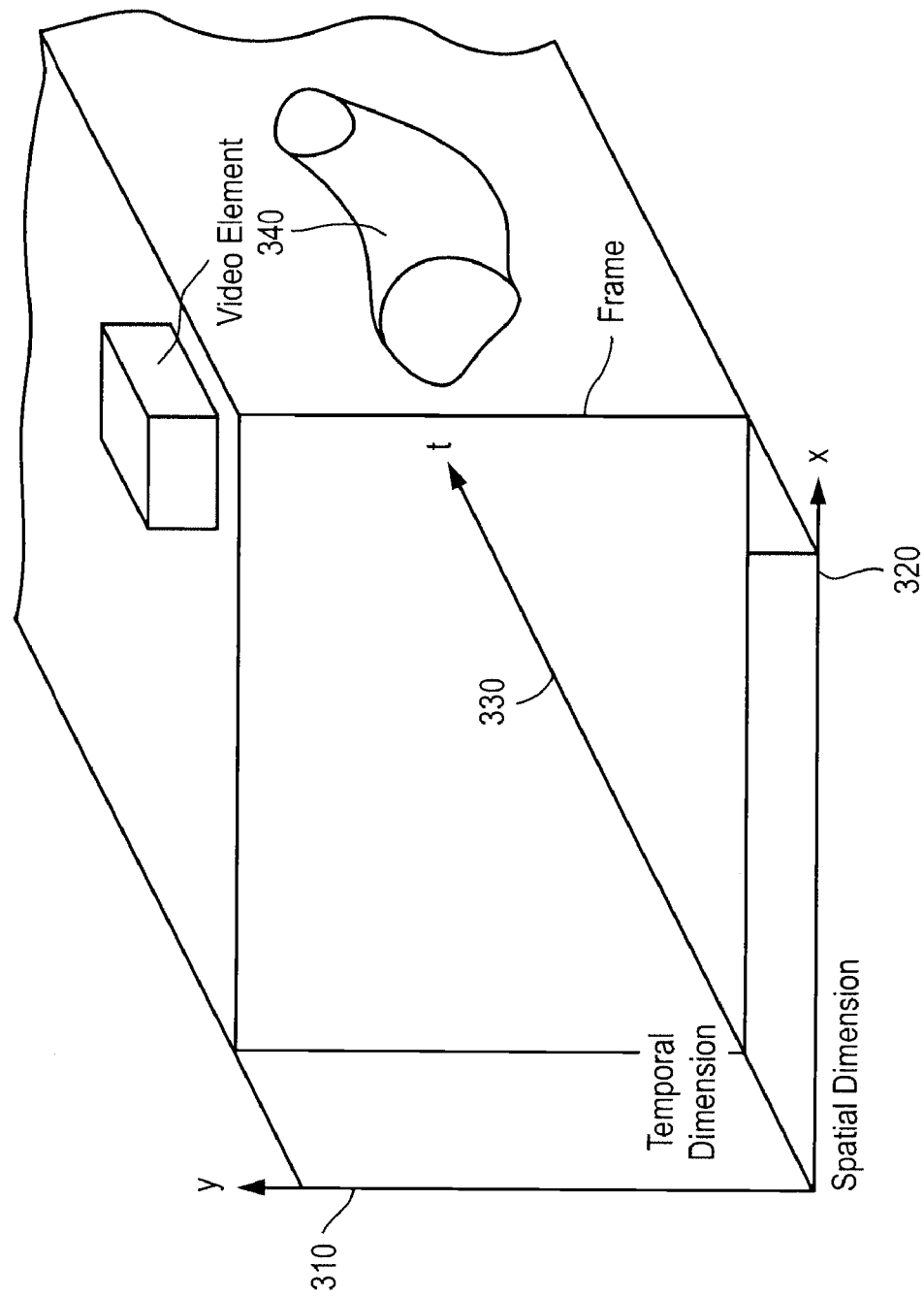
FIG. 3 shows examples of video elements.

During the division stage 230, each sequence is divided into video elements. As shown in FIG. 3, a video element 340 is defined as a 3-dimensional spatial-temporal subset of the video I(x,y,t) i.e., a continuous group of pixels within a few subsequent frames. It is possible for video elements to overlap each other depending on their locations and sizes. The three dimensions consist of spatial x axis 320, spatial y axis 310, and temporal t axis 330. Visually, each generic video element 340 is presentable as a "snake" or "tube", in which spatially continuous pixels in different individual frames are combined together. The most generic video element is a contiguous spatio-temporally subset of the video with coherent properties.

Constraints for video elements 340 on sizes and dimensions exist, such that elements 340 which are too short or too long (in the temporal duration), too small or too large in the spatial size) are discarded. In one of the preferred embodiments, the temporal duration of an element 340 is set to approximately 10 frames minimum and 100~10000 frames maximum. With typical frame rates of 30 frames per second, 10 frames correspond to approximately ⅓ second of a broadcast video. Therefore 100~10000 frames correspond to 3~300 seconds of a video, or in other words, a continuous noticeable appearance of a video object. In one of the preferred embodiments, in addition to temporal constraints, a video element 340 has spatial dimensions not smaller than 5% and not exceeding 50% of the frame size. An element 340 with a size too small is usually not important, and one too big is usually a background object.

Given the fact that several theories and methods to partition the video into video elements 340 exist in the literature, few examples of defining such video elements are given below for illustration purposes.

The simplest example of a video element 340 is a three-dimensional block of pixels of the form I(x,y,t), where M1<=x<=M2, N1<=y<=N2 and T1<=t<=T2.

Another possibility to detect video elements 340 is as spatio-temporal boundaries of I(x,y,t). Such boundaries represent places in the video in which abrupt changes occur either in the spatial or the temporal dimensions. The interior of the spatio-temporal boundary can be associated with an object present in the video along time. Boundary detection is possible using a three-dimensional edge detector. As an example of an edge detector, the norm of the three-dimensional gradient can be used, e.g., $$E(x,y,t)=I_x^2(x,y,t)+I_y^2(x,y,t)+I_t^2(x,y,t),$$

or $$E(x,y,t)=|I_x(x,y,t)|+|I_y(x,y,t)|+|I_t(x,y,t)|,$$

where $I_x$, $I_y$, $I_t$ denote the discrete derivatives of I w.r.t. x, y and t. Other edge detectors common in literature can be employed as well.

Another possibility to detect video elements 340 is as spatio-temporal regions with consistent motion, using spatio-temporal segmentation methods, one of which, disclosed in D. Feldman and D. Weinshall, Motion segmentation using an occlusion detector. According to this approach, described for illustration purposes in several steps as follows, each video frame can be thought of as an instantaneous two-dimensional depiction of moving three-dimensional objects. While moving, foreground objects cover and uncover background objects. Thus, pixels belonging to foreground objects in consecutive frames can be obtained by motion compensation, while pixels of background objects usually cannot. Detecting such pixels can serve as an indication of regions with coherent motion.

Figure 4:
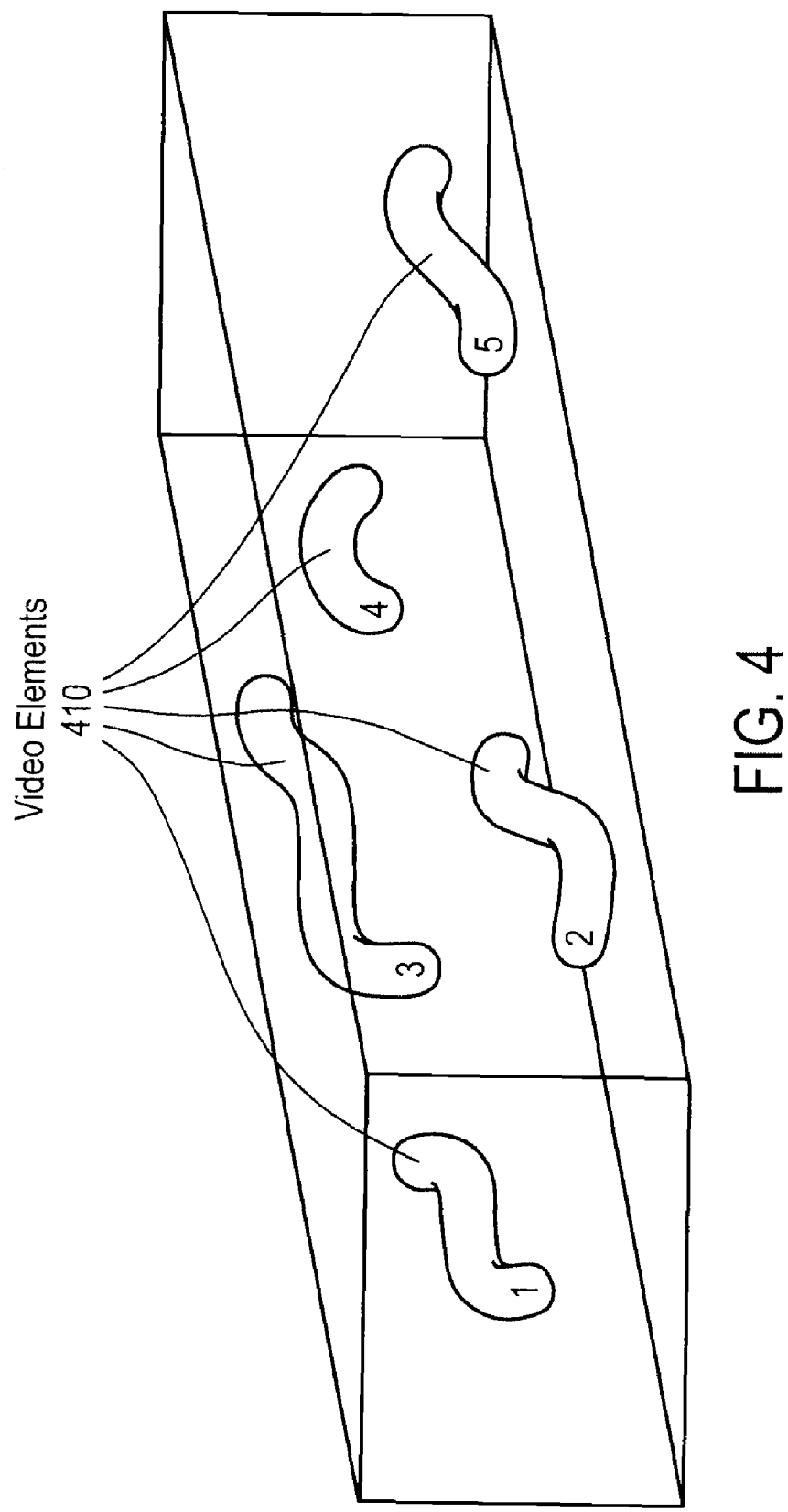
FIG. 4 shows the first stage of video digest generation: division stage.

A spatial neighborhood N(x,y) of a pixel I(x,y,t) has coherent motion if there exists a vector (vx,vy) such that I(x,y,t+dt)=I(x+vx,y+vy,t) for all x,y in N(x,y). The boundaries of such regions can be detected by employing an occlusion detector, which indicates for every pixel I(x,y,t) whether it can be obtained as the result of a displacement from previous frames. D. Feldman and D. Weinshall compute the minimum eigenvalue of the spatio-temporal structure tensor, represented at each pixel by the 3×3 symmetric matrix $$G = \sum_{(x,y) \in N(x,y)} \begin{bmatrix} I_x^2 & I_x I_y & I_x I_t \\ I_x I_y & I_y^2 & I_y I_t \\ I_x I_t & I_y I_t & I_t^2 \end{bmatrix}$$

where Ix, Iy and It denote the discrete derivatives of I w.r.t. x, y and t. The spatio-temporal structure tensor serves as an indicator of regions with coherent motion and texture (e.g. corresponding to objects moving in time); a standard segmentation algorithm is then applied to create a binary map for each pixel, determining whether it belongs to a coherent region or not. Each pixel is then assigned and labeled a value/index 410 to indicate which video element 340 it belongs to, as shown in FIG. 4.

Another possibility to detect regions with consistent motion is by using motion vector information from the decoder 130 or encoder 120 (since the input video stream usually comes in compressed domain and undergoes decoding in the DVR, side information from the video codec is readily available). Specifically, consistent motion in a region is indicated by approximately equal motion vectors. Pixels at which occlusions occur are boundaries of consistent motion regions, and are typically indicated by high prediction error, which, in turn, results in a large number of texture bits. The number of texture bits can be used to infer the boundaries of consistent motion regions.

Another possibility to detect video elements 340 is by detection of continuously appearing objects, with properties known a priori, in consecutive frames. Examples of universally salient objects which often occur in video content are human faces, human body parts, nudity contents, texture patterns, and texts. Such objects can be detected using common methods described in literature, for example, the object detection algorithm described in P. Viola, M. Jones, Rapid object detection using a boosted cascade of simple features (or one of its variants).

Assignment of Importance Rating to Video Elements

During the assignment stage 240 of the video digest generator 220, each video element 340 is assigned a local rating, according to which the presence of the element in the output will be determined. The rating can be interpreted as a measure of importance or relevance of the element, or in other words, an indication of desirability.

The rating of a video element 340 can be determined by measuring its dissimilarity to other elements. An element gets a high rating if it is similar to a class of elements referred to as positive examples, and is dissimilar to another class of elements referred to as negative examples. A video element considered important is thus represented by a high positive importance rating. Conversely, a video element is considered unimportant if it is dissimilar to positive examples and similar to negative ones, and the unimportant case is represented by a low (large negative) importance rating.

Positive and negative example elements are defined in three ways: user interactions, factory default examples and video elements contained in current video content.

Figure 5:
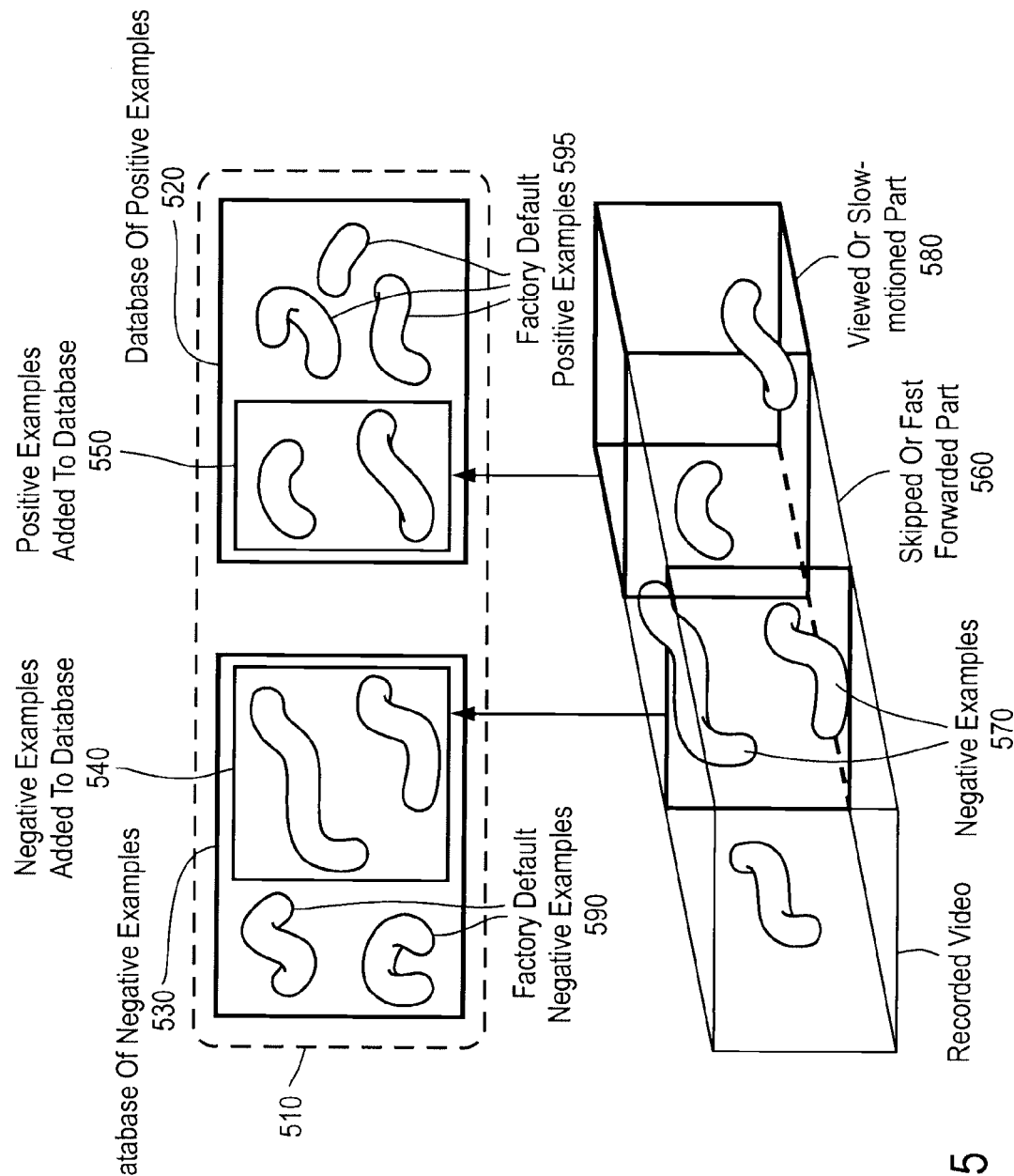
FIG. 5 shows generation of positive and negative example from the user behavior pattern in watching a recorded content.

User interaction involves analyzing the user behavior, recording the user preferences, and deciding which type of content the user prefers and dislikes. Explicit interaction, requiring the user to rate elements, is usually undesired being a distracting activity. As shown in FIG. 5, the update of the positive example database 520 and the negative example database 530 is performed during the use of the system, by means of implicit interaction with the user. The user can be watching a recorded video or a broadcast video content, where the former one has its video elements already created in division stage 230, and the later one has its video information stored during the encoding/decoding process. For example, if the user is viewing a recorded program and skips a portion 560 by fast-forwarding it, this may be an indication of the portion 560 being unimportant. Video elements 570 from such a portion may be added to the negative example database 530 as negative examples 540 and used for the importance rating assignment during video digest generation of other content in the future. Conversely, portions 580 at which the user focuses his attention may be added to the system positive example database 520 and used as positive examples 550 in the same manner. Video elements are assigned with ratings according to example elements generated as described above.

Video elements are also compared to the positive and negative examples in the database, and according to this, a decision whether to leave or remove an example from the database is made. This is used mainly in order to reduce the effect of a possible situation where an element can appear both in desired and undesired content. For example, if a video element was added as a negative example (because it appeared in undesired content), and then reappeared multiple times in desired content as a positive example, it may be moved from the negative examples to the positive examples database, as representing more accurately desired rather than undesired content. An element appearing with the same frequency in desired and undesired content shall be removed as non-representative.

Besides user interaction, a set of factory default positive examples 595 and negative examples 590 is factory pre-stored in the system database. For example, the system will remove advertisements within a video program and gives priority to portions of the video in which human faces appear, if video elements containing human faces are stored in the database as default factory positive examples 595, and those containing advertisement are defaulted as negative examples 590. By comparing against the stored examples, video elements appearing in advertisements will be given low ratings and will likely be removed so as not to appear in that particular video digest, whereas those containing human faces will be given high ratings and will be more apt to appear in the resulting video digest.

Figure 6:
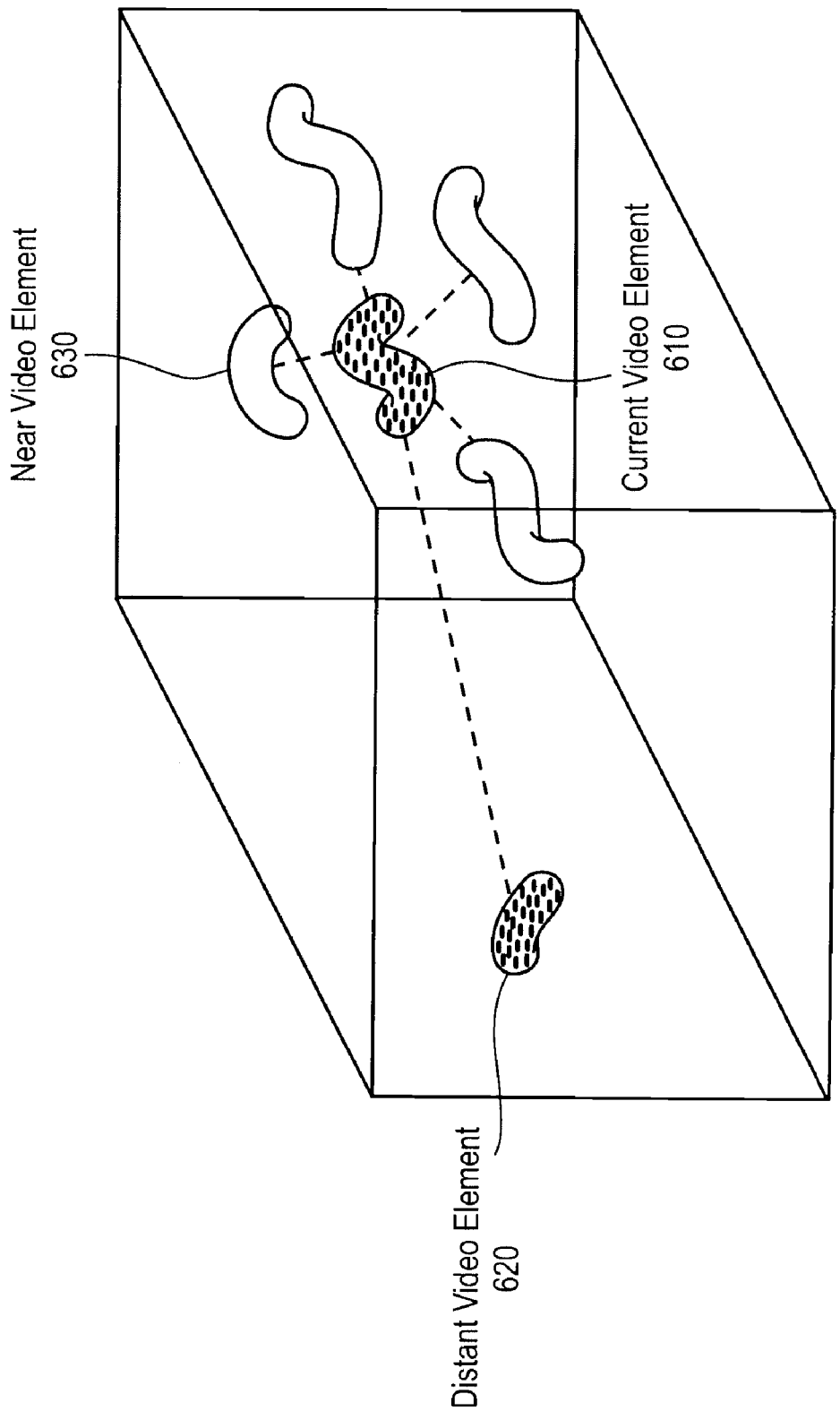
FIG. 6 illustrates spatio-temporally distant and near elements.

One way of determining the importance of an element is by relating the element to the video content in which the element itself exists, or in other words, detecting the self-similarity of the video content. Several video elements in the video content are detected, selected, and stored in the database 510 as example elements during encoding/decoding process, and that element 340 is then compared to those examples stored in the database 510 for the rating purpose. FIG. 6 shows a video element 610 being compared to other video elements in the same video sequence. For example, if the video element 610 is similar to the spatio-temporally distant video element 620, this may be an indication of redundancy. Regarding spatio-temporally distant video element 620 as negative example, redundant video elements will be given a low importance rating, which will result in their removal during the video digest process. As another example, if the video element 610 is dissimilar to spatio-temporally near video elements 630, this may be an indication of unpredictability, which can be caused by appearance of new objects or abnormal behaviors that disrupt the local continuity of the video sequence. If spatio-temporally near video elements 630 are regarded as negative example, video elements corresponding to sudden events will be given a high importance rating, as being probable key events in the sequence.

Figure 7:
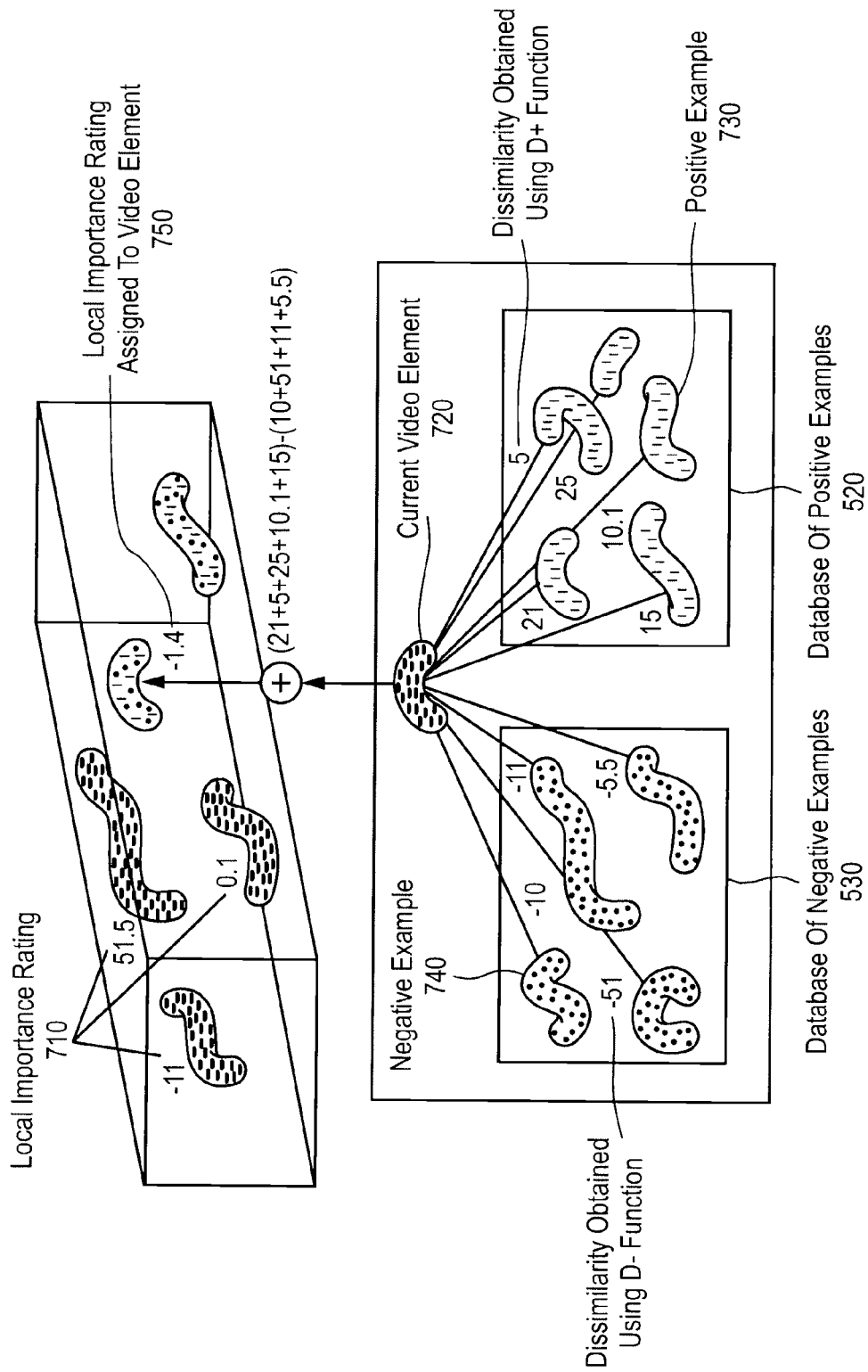
FIG. 7 shows the second stage of video digest generation: assignment stage.

One embodiment of the present invention, as shown in FIG. 7, is the algorithm used to assign a rating 710 to a video element 720 that performs as follows: the video element 720 is compared to all the positive examples 730 in the database using a dissimilarity function d+; the video element 720 is then compared to all the negative examples 740 in the database using a dissimilarity function d−; values obtained using dissimilarity function d− are summed up with negative sign; values obtained using dissimilarity function d+ are summed up with positive sign; the total sum of values from both functions yields a rating 750 representing the importance of the video element 720. The local rating of current video element v can be computed as follows:

$$\text{Rating}(v) = \sum_k d_+(v_k, v) + \sum_j -d_-(v_j, v),$$

where $v_k$ are negative examples and $v_j$ are positive examples, and d+ and d− are measure of dissimilarity to positive and negative examples, respectively. Negative values of Rating(v) imply that v is unimportant, whereas positive values of Rating(v) imply that v is important.

Given the fact that many dissimilarity functions and methods have been taught and described in the literature, few examples of measuring dissimilarity are given below for illustration purposes.

Generically, the measure of dissimilarity between two video elements is quantified by a bi-variate function denoted by d(v,w), where v, w are two video elements. As a particular case, it can be assumed that d(v,w) obtains only non-negative values, is a symmetric and transitive relation, i.e., corresponds to a mathematical definition of a generic metric between w and v. Hereinafter, the terms distance, dissimilarity and metric are used synonymously.

It is possible to compute dissimilarity as a sum of different distance functions, for example, $$d(v, w) = \sum_k d_k(v, w),$$

where $d_k$ are different distance functions.

The choice of the particular way to measure dissimilarity depends on the video elements, into which the video sequence is divided, at the division stage. For example, if pixel blocks of uniform size are used as video elements 340, simple measures of similarity such as sum of absolute differences (SAD) or sum of squared differences (SSD) can be employed.

If the video elements 340 have different shapes, similarity measures based on comparing the histograms of element pixels can be used, in the following way:

$$d(v,w) = \|h(v) - h(w)\|,$$

where h(v) is the histogram of the pixels of element v, and $\|\ \|$ is a norm (for example, the L1, L2, or Linf norm). The comparison of pixel intensity histograms can be performed in both time domain and frequency domain. A more sophisticated way to measure distance between distributions, such as the Monge-Kantorovich earth-moving distance (EMD), Bregman distance or Kullback-Leibler divergence, can be used to compare the histograms. Such similarity measurements can be used for nudity detection, where video elements 340 have arbitrary geometries, such as elements containing skin.

If video elements 340 are objects with properties known a priori (e.g. human faces), more specific similarity measurements described in literature can be used. For example, in order to compare faces of two different subjects, comparison of facial features such as eyes, mouth, nose etc. can be used.

Stages 230 (division) and 240 (assignment) can be repeated iteratively, as a refinement method. First, I(x,y,t) is divided into some initial video elements, e.g., regular overlapping blocks. Then, each block is assigned an importance rating, which is represented as a matrix Rating(x,y,t), e.g., by means of interpolation. A new division is created based on the importance rating, e.g. by finding the edges of Rating(x,y,t). The whole process is repeated in several iterations until convergence, which can be determined by small variations of the video elements. Such a scheme has resemblance to the alternative optimization used in the Max-Lloyd vector quantization method, described in A. Gersho, R. M. Gray, Vector quantization and signal compression.

Aggregation of Video Elements into Video Aggregates

Figure 8:
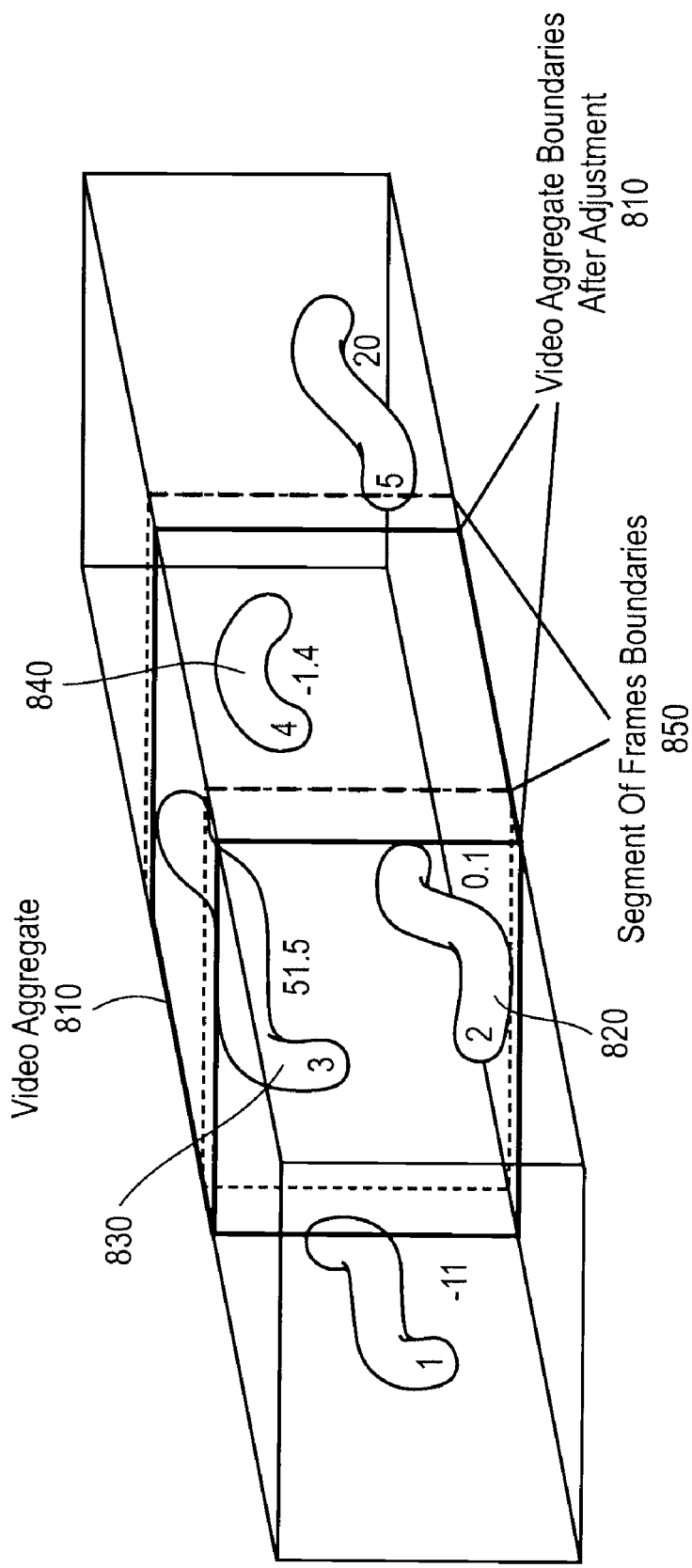
FIG. 8 shows aggregation of video elements into video aggregates.

Since video elements 340 can be spatio-temporal regions of arbitrary shape, which means they can be in non-displayable format due to the randomness of their shapes, another stage converting them into subsets of video, referred to as "video aggregates," which allow video elements to be properly displayed, is usually required. One of the preferred embodiments of such aggregation process is shown in FIG. 8. The aggregation stage 250, creating a video aggregate 810 by aggregating video elements 820, 830, and 840, consists of several steps: the video is first divided into segments of frames (typically ranging between 100 to 1000 frames), with possible overlap between each segment; for each segment of frames, video elements falling within this segment are identified from the binary map computed at division stage 230, for example, elements 820, 830, and 840 are identified in segment 850 (the dotted-line boundary box); the video aggregate 810 (hard-line boundary box) are formed by adjusting the temporal extent of segment 850 (i.e., the starting and ending of segment 850) so that each video element within the video aggregate 810 is contained entirely, ie, element 840 and 830 are cut off by the dotted-line box 850, but are included entirely by the hard-line box 810 after the adjustment. In one of the preferred embodiments, if two video aggregates overlap, as a result of the previous step, they are merged into a single one.

Figure 9:
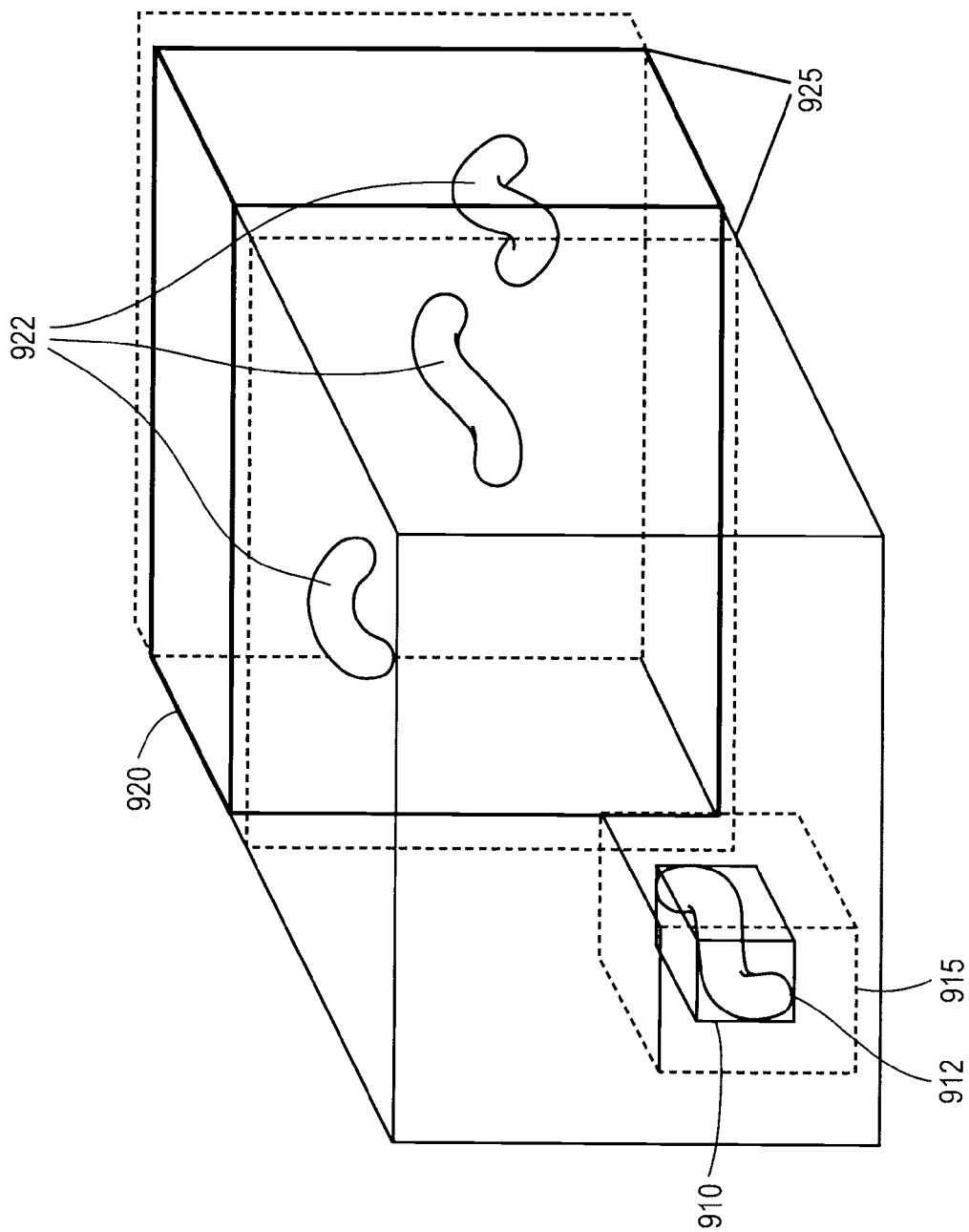
FIG. 9 shows example video aggregates defined as a temporal bounding box and a spatio-temporal bounding box.

As shown in FIG. 9, a video aggregate, such as the bounding box 910, can be generally defined as an aggregate spatio-temporal group of contiguous pixels spanning at least certain ones of the plurality of sequential frames of the video that contains one or more video elements, and in many instances more than one video element. More specifically, a video aggregate is preferably a rectangular spatio-temporal region containing video elements. The result is a rectangular region 910 in the sequence of frames containing the video element 912.

A particular case of the spatio-temporal bounding box 910 is a temporal bounding box 920, which takes up the whole frame size, containing one or more video elements 922. The result of a video aggregate in this case is a sequence of frames containing video elements 922.

The video aggregate defined as a temporal bounding box 920 can also contains temporal margins 925, i.e., a sequence of frames adjacent before and after the temporal bounding box 920. The number of frames can be preset or content-adaptive. In a generalized case, the video aggregate defined as spatio-temporal bounding box 910 can contain spatio-temporal margins 915, i.e. rectangular blocks of pixels around the bounding box.

Besides video elements, audio elements can also be created. Audio streams, such as a sequence of sampled audio digital signals, are usually synchronized with video sequences while delivered as a broadcast media. Since the audio is a one-dimensional signal, its processing has much less degrees of freedom compared to the video component.

When inputting to a video digest generator, audio elements are detected and created according to criteria such as sequence length and audio patterns. The simplest example to define an audio element is by detecting uniform blocks of audio signals. Another example is by detecting pre-determined audio patterns such as shots, human speeches, pre-defined words, and music, etc. Audio elements are also given a rating and are being aggregated using method described above. The resulting aggregates of audio elements, referred to as audio aggregates, can then be presented together with video aggregates. The audio aggregates can also contain temporal margins adjacent before and after the audio blocks, so that the audio aggregates contain complete audio elements.

Figure 10:
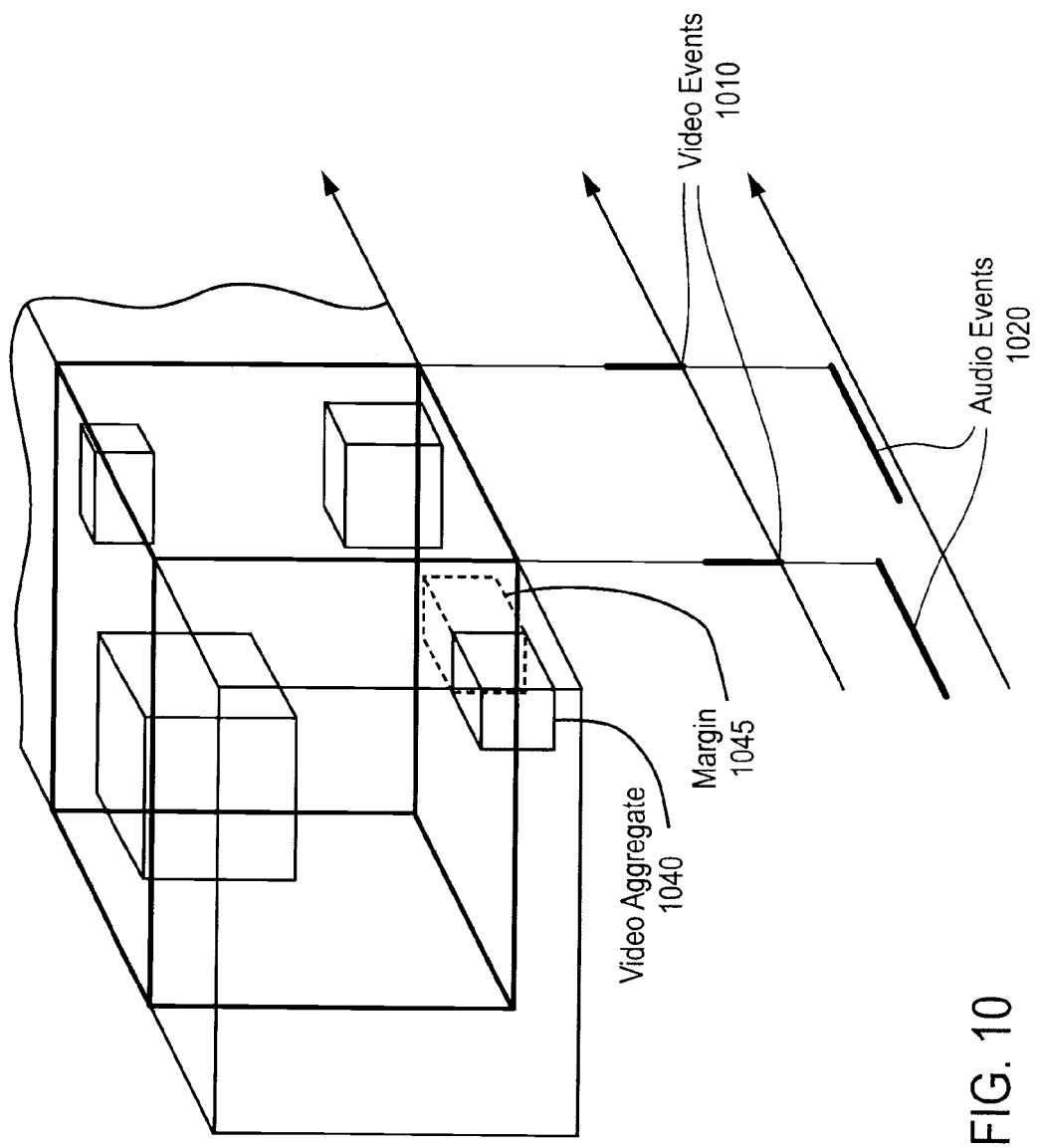
FIG. 10 shows aggregation of important video elements into video aggregates using additional event information.

Additional information can be taken into consideration when defining the video and audio aggregated. For this purpose, video events 1010 and audio events 1020 defined in FIG. 10 are created. Events represent additional information that is not necessarily conveyed in the definition of the video aggregates and that should be accounted for during the display of the video digest. For example, the temporal duration of the video aggregate should contain entirely a speech fragment and not interrupt it in the middle. An event can be instantaneous or long. Examples of instantaneous events can be: shot cut (transition between video sequences captured continuously by a camera, or resulting from editing), beginning of an advertisement, first or last appearance of an object, etc. Examples of long events can be: speech sound in the audio track, music, continuous camera motion, etc.

FIG. 10 shows an example of simultaneously processing video aggregates and audio aggregates. In this example, the boundaries of video aggregate 1040 interrupt the audio event 1020. The temporal extent of the video aggregate 1040 can be adjusted by adding the margin 1045 in order for it to contain entirely the event 1020.

Generically, the video aggregate resulting from the aggregation of video elements and audio and video events can be presented as a logical operation (union, intersection, complement and combinations thereof) between them.

Figure 11:
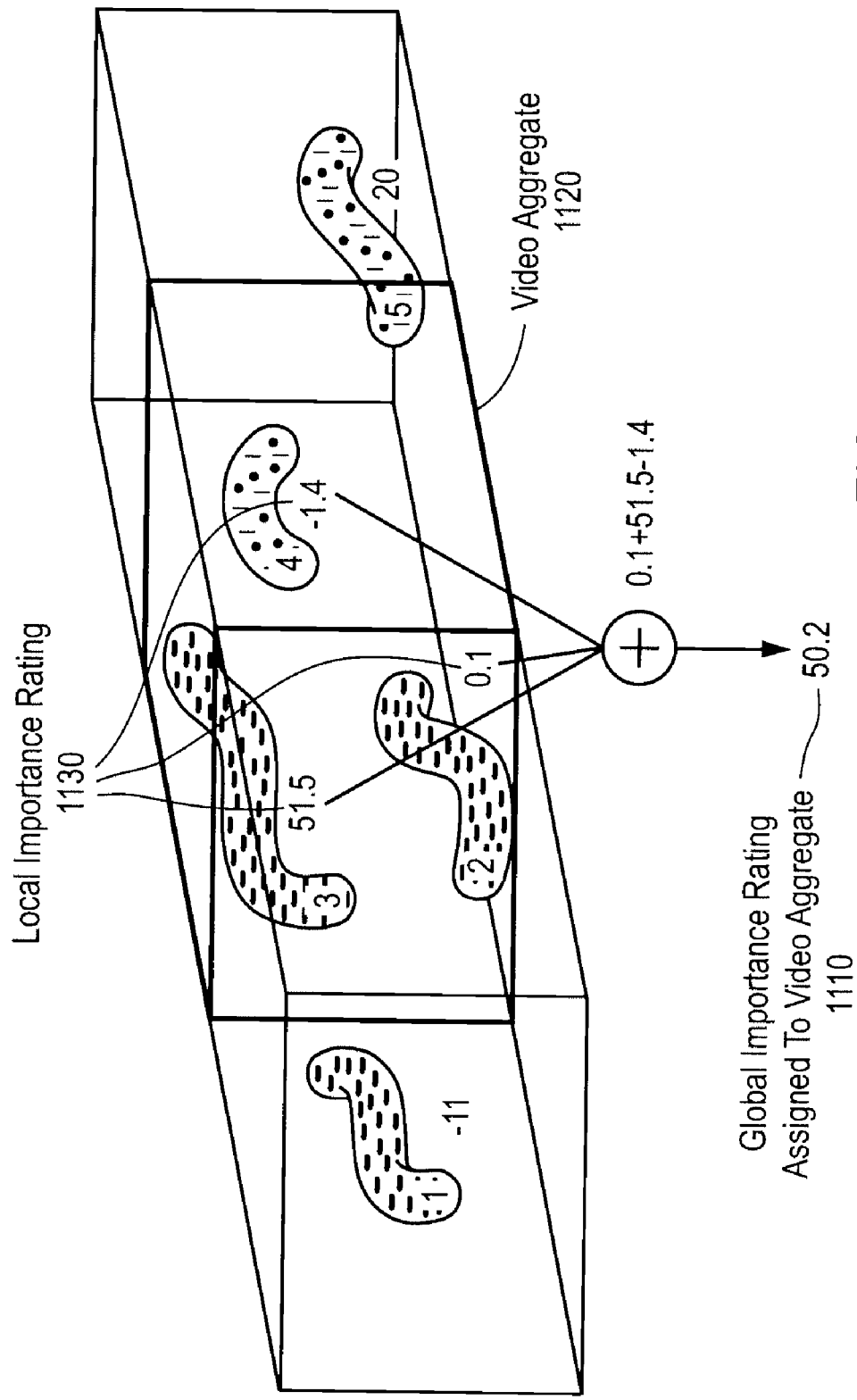
FIG. 11 shows aggregation of local importance ratings into global importance rating.

Similar to video elements 340, video aggregates are also given an importance rating, or to the extent that a video aggregate corresponds to the video element, it may have the same importance rating. The local ratings 1130 of each video element contained in the video aggregate are aggregated to generate a global rating 1110 of the video aggregate. FIG. 11 shows one way of obtaining global rating 1110 of a video aggregate 1120 by summing up the local importance ratings 1130 of each video element contained therein. Other ways, including averaging, taking the maximum, taking the minimum, taking distributions, taking square roots of the importance ratings 1130 of the video elements of the video aggregate 1120, should be apparent to those ordinarily skilled in the art, and those are also included in the spirit of the present invention.

The global rating 1110 has significance in displaying the video aggregates. One way of sorting video aggregates is in descending order according to their global importance ratings, and such order will be used in organizing video aggregates to obtain the video digest.

The specific way in which the video aggregates are selected and displayed through the user interface 260 largely depends on the mode in which the video digest generator is working. Some of these modes are controlled by the user as described in the next sections.

User Interface

The function of the user interface 260 is to interact with the user, select and display the video aggregates obtained as the output of the video digest generator. The interaction with the user can be divided into explicit and implicit categories. Explicit interaction includes functions that the user can control. The basic capabilities given to the user are setting of the video digest engine, like the digest duration (which, in turn, can be pre-set in a few modes described in the following section), and control of the video digest generator output. The latter includes navigation throughout the video. Implicit interaction, on the other hand, does not involve direct actions from the user, and infers information from indirect user behavior.

The video aggregates to be displayed can be arranged temporally (i.e., the video aggregates are displayed one after one, in some order), or spatially (a plurality of video aggregates is displayed simultaneously). The former is referred to as video trailer and the latter as video poster.

Figure 12:
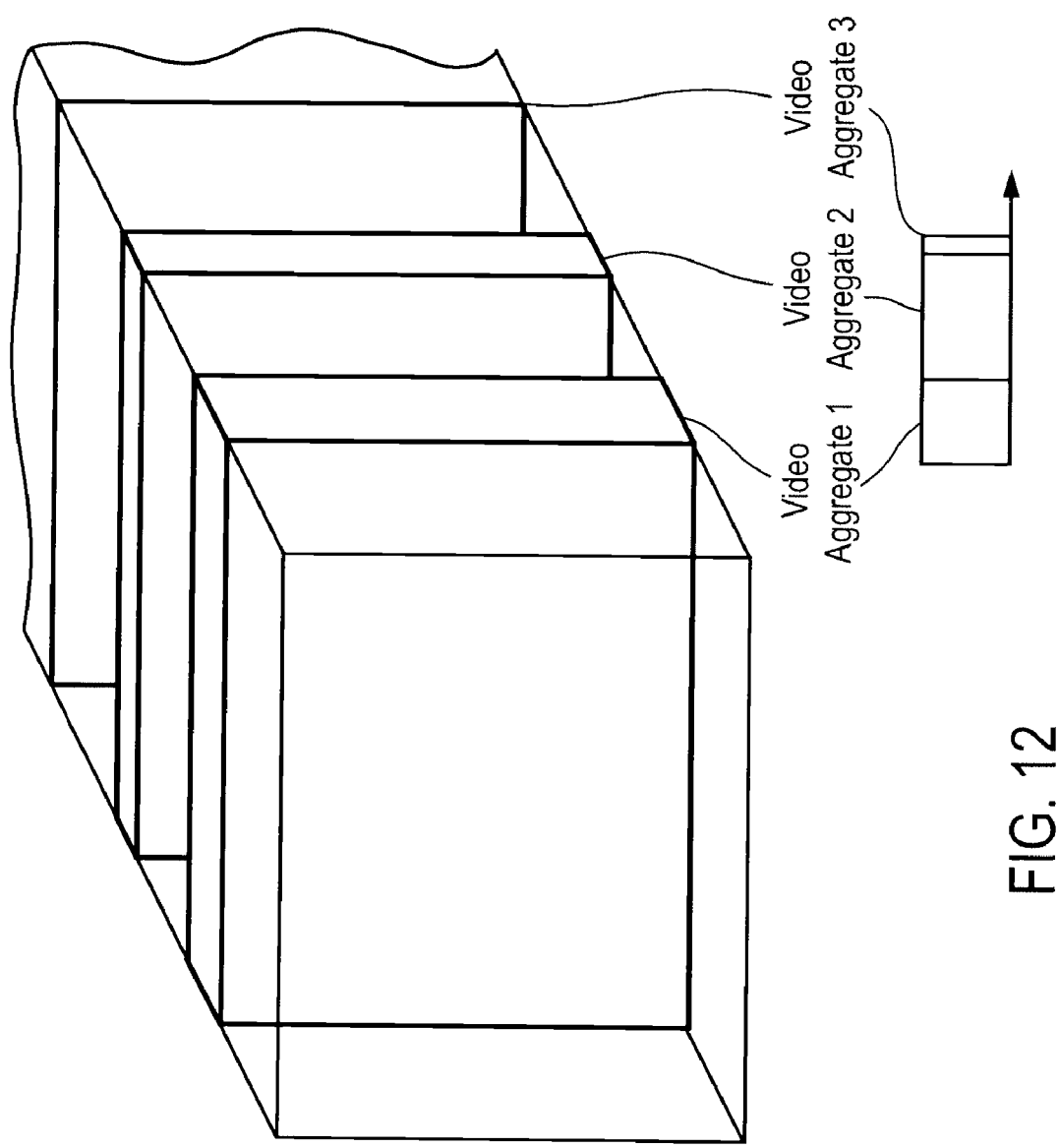
FIG. 12 is a conceptual illustration of a video trailer generation.

FIG. 12 shows a video trailer (temporal) generation, from which, the video aggregates are presented in some order. In this case, the video aggregates used are of entire frame size (e.g. obtained as temporal bounding box 920), or subsets of the frame (e.g. obtained as spatio-temporal bounding box 910), scaled accordingly.

Figure 13:
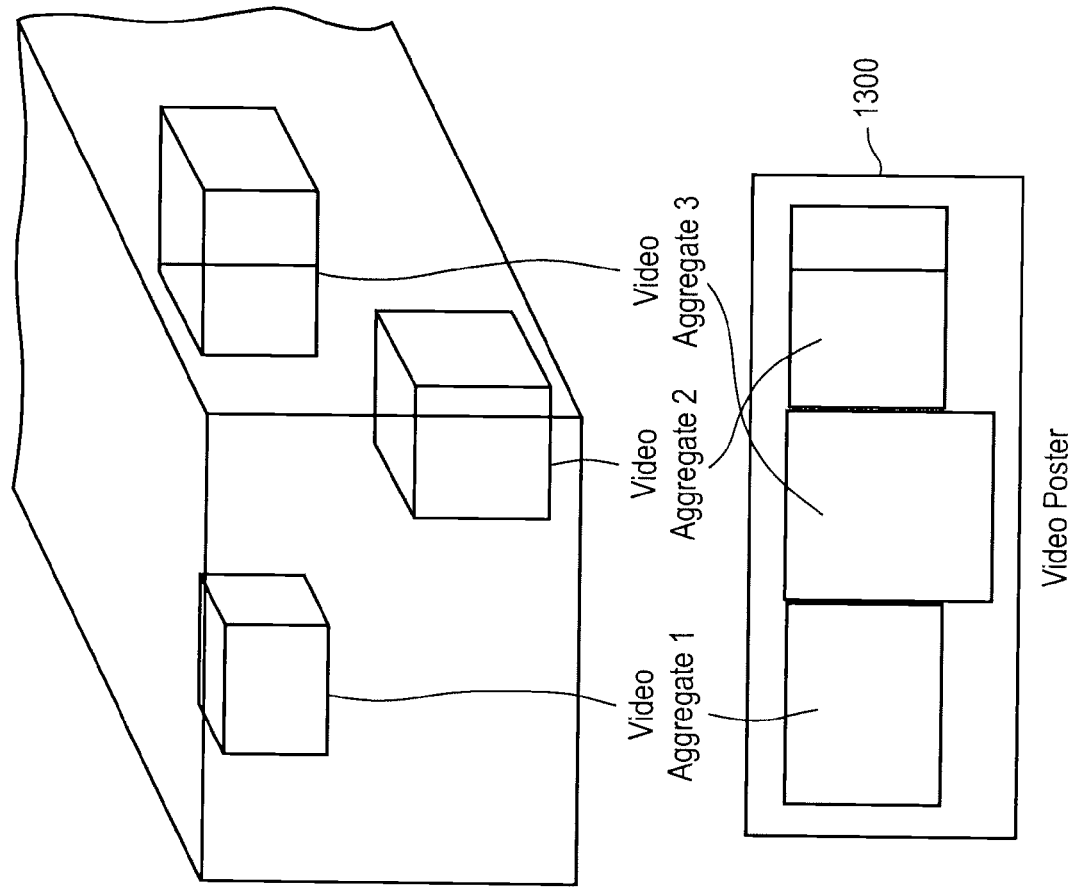
FIG. 13 is a conceptual illustration of a video poster generation.

FIG. 13 shows a video poster (spatial) generation, from which the video aggregates are presented together as portions of the same image 1300. The video aggregates can be of different sizes in this case. In order to fit the displayed video poster to the display resolution, a spatial up- or downscaling may be required. The spatial arrangement of the video aggregates can be fixed, or dependent of the content and the user settings. The playback speed of each video aggregate can be constant or variable, and also be given as a parameter to the user.

The selection of video aggregates that will be displayed in the video trailer (FIG. 12) can be performed as follows: the video aggregates are first sorted according to their rating in descending order and those with the highest rating are selected; the number of video aggregates to be selected depends on the duration of the video trailer to be generated, which is a parameter controllable by the user; the user can also control the order in which the video aggregates are presented (two basic possibilities are chronological order or importance order) and the speed of their playback.

Determining the similarity of video aggregates can be performed by multidimensional scaling algorithms and their variants, which represent a dissimilarity structure as a pattern of points in a low-dimensional space.

The selection of video aggregates that will be displayed in the video poster (FIG. 13) is done similarly to the case of video trailer. The number of video aggregates to be selected depends on the spatial configuration of the poster, i.e., how many videos simultaneously displayed it can accommodate, and the length of each such video. The user can control the spatial configuration of the poster (number of simultaneously displayed video aggregates, their locations). The video aggregates locations and sizes can be fixed, dependent on the video aggregates importance and specific contents (e.g. all video aggregates containing human faces are displayed on the top), or based on video aggregates similarity (e.g. video aggregates containing similar video elements, or video elements similar to a common example element can be grouped together).

Video poster and video digest can be used as a visualization tool for browsing through the input video. This can be done both in the video trailer and the video poster modes. The mechanism behind such navigation is a hyperlink-type interface, allowing the user to click a region of the poster (or press a button while a certain video aggregate of the video trailer is playing). The result of this action will be displaying the video from the selected temporal location currently being displayed. Alternatively, the entire scene containing the current video aggregate can be presented.

Implicit interaction with the user can be used for configuring the video digest engine. Analyzing the user behavior, it is possible to decide which type of content the user prefers, thus refining the importance rating criteria. For example, if the user is viewing a recorded program and skips portion of it by fast-forwarding, this may be an indication of the portion being unimportant, and in one embodiment of the invention can be used as such. Video elements from such a portion may be added as negative examples and used for the importance rating assignment during video digest generation of other content in the future. Conversely, portions at which the user focuses his attention can be used as positive examples in the same manner.

Applications and Use Cases of Video Digest

Invoking different settings of parameters of the core video digest generator, it is possible to apply the video digest engine for different applications and use scenarios. Such sets of parameters can be defined as pre-set modes available for choice in the user interface. The following conceptual uses and corresponding modes are distinguished: abbreviation function 1410, summary function 1420, and preview (fast forward) function 1430.

Figure 14:
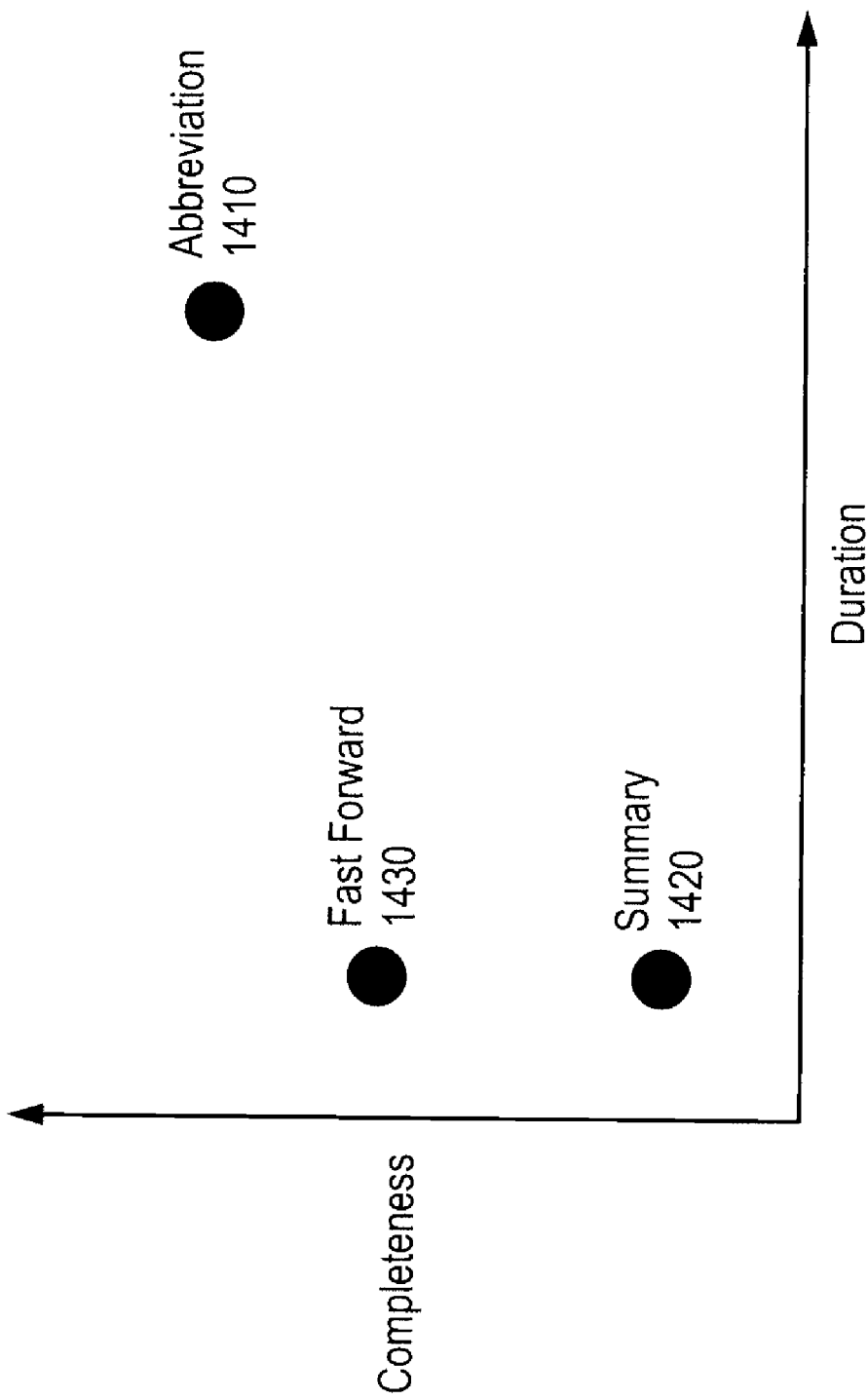
FIG. 14 shows the usage of video digest represented in terms of duration and covering.

FIG. 14 shows the two main factors controlling the different uses of video digest: duration and covering. Duration refers to the extent to which the video aggregates produced by the video digest generator become shorter than the original content. Covering refers to uniformity with which the selected video aggregates cover the original video, i.e., how complete can the viewer's impression of the original content can be from viewing the selected video aggregates. Both factors can be represented on the scale 0-100.

FIG. 15(A-C) shows conceptually the portions of the video removed and remaining 1590 using the different abbreviation (15A), summary (15B) and preview (15C) modes.

Abbreviation mode (15A) results in a video digest with both large duration and covering. The main emphasis is on showing the content in less time, leaving as much as possible of the original content. In a typical case, most of the meaningful information in the video is preserved, such that content deletion is not noticeable (50-90% of the content remains). Abbreviation can be conceptually compared to an abridged book: the content is almost the same, though takes less time to read. As a typical application, we can think of a digital video recorder (DVR), used for recording programs for future viewing. A typical user will set up the DVR to record a program transmitted while he is at work and will watch it later in the evening. Often, the user does not have time to watch all the programs he would like to: the amount of content is too large. Using video abbreviation, it is possible to make the user watch more content he wants in less time. The video digest length is a parameter that is typically given to the user control.

When in the abbreviation mode, the video digest duration parameter is large (the user controls the percentage of the original duration), the display mode is video trailer with chronological order of video aggregates.

First level of abbreviation is achieved by removing unimportant information. This can be performed by means of negative examples, i.e., finding of information that is a priori known to be unimportant (e.g. advertisements, open and closing credits) or, by finding important information and removing all the rest, or a combination thereof.

Second level of abbreviation can be achieved by changing the speed of video aggregates that are displayed. For example, the display speed of a video aggregate can be inversely proportional to its importance, such that important video aggregates are displayed with their normal speed, while less important video aggregates are displayed quicker. If audio playback is allowed, the audio duration is changed accordingly by means of commonly used audio time domain compression/expansion signal processing methods, which allow changing the duration of an audio without altering its pitch.

Summary mode (15B) results in a video digest with small duration and small covering. The main emphasis is on leaving only the most representative "highlights" of the video content, which will help the user make a judgment about the entire content. In a typical case, only a small portion of the data (1-20%) will remain. An example from motion picture industry is a movie trailer, showing highlights from the movie scenes. Unlike abbreviation, the main problem in summary generation is the detection of the most meaningful and representative portions.

When in summary mode, the video digest duration parameter is small (the control is given to the user) and the display mode is either a video trailer or a video poster. "Highlights" are selected video aggregates with high importance rating, either content-related (objective) or user-related (subjective), or a combination thereof. Subjective importance is based on positive and negative examples accumulated from previous implicit user interaction.

Preview (fast forward) mode (15C) results in a video digest with small duration but high covering. This is an intermediate use mode between summary and abbreviation, described above. The user wants to have an impression of the entire content but in significantly shorter time (×4-32 faster). Fast forward is a traditional way of navigation in video content, used mainly in order to access to portions of the content the user wants to see. The main disadvantage of traditional fast forward is that it is linear, accelerating the playback uniformly throughout the video. As a result, if the fast forward speed is too high, the displayed content become meaningless (e.g. at ×32 playback speed the user sees chaotically changing frames). Speeds at which the content can be understood are usually low (×4-×8), which implies such a fast forward takes too much time.

When in preview mode, the display mode is video trailer with chronological order of video aggregates. The user controls the global playback speed; the actual speed is adaptive. Most of the video aggregates are left, and fast forwarding effect is achieved by showing the video aggregates with a higher speed. More important video aggregates are shown with slower speed, less important with faster one.

Figure 16:
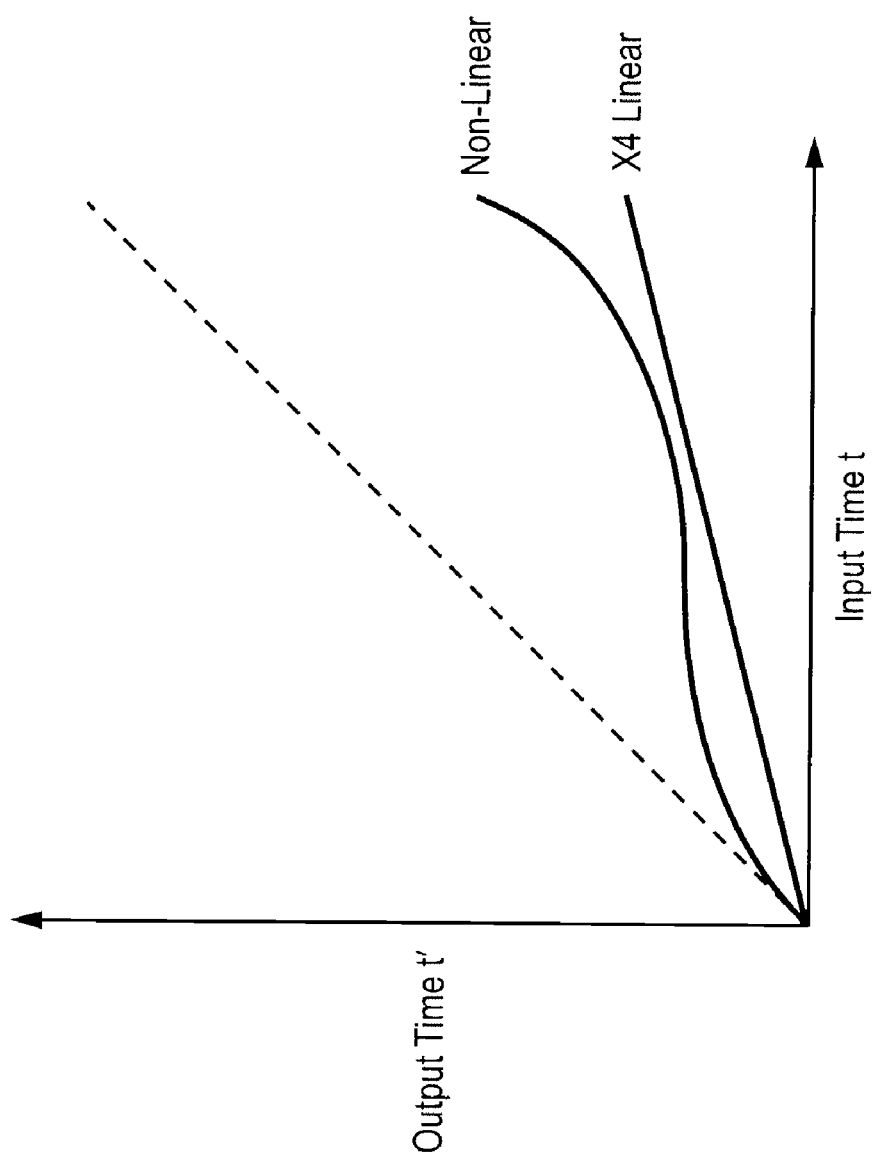
FIG. 16 illustrates non-linear time warp for preview generation.

FIG. 16 illustrates the preview mode according to the present invention, which can be conceptually thought of as non-linear warp of the time axis of the video, making some video aggregates played faster and some slower, according to their importance. Some video aggregates known as unimportant (e.g. advertisements) can be completely skipped. The importance is also determined according to content- or user-criterion. The main control for the user is the forwarding speed.

Spatio-temporal Zooming and Video Navigation

Another application of the data generated by video digest is navigation in the video. Thinking of video as a three-dimensional structure of data (two spatial dimensions plus one temporal dimension), the user can navigate through this data in different ways.

The simplest navigation is fast-forward, in which the video is traversed with uniform speed in temporal dimension, with the speed depending on the user input. Similarly, the video can be traversed in backward direction by rewind controls. Today, this is the most common way of video navigation supported by DVRs, typical controlled by two buttons, such as those shown in FIG. 17B: forward 2610 and backward 2600.

Employing the video digest in the aforementioned preview mode with conventional forward and backward navigation controls allows traversing the temporal dimension with non-uniform speed, with the speed locally depending on the importance of the content, and globally on the length of the video digest specified by the user. The video digest in this case removes the unimportant details for the purpose of fast temporal navigation.

The ability to control in real time the amount of removed details (the resolution of the video digest), or in other words, the length of the video digest, gives the user a capability referred here as temporal zooming. FIG. 17B depicts the possible modification of the standard video navigation control interface for the purpose of temporal zooming by means of adding two buttons: going up 2500 and down 2510 in the resolution.

Figure 17A:
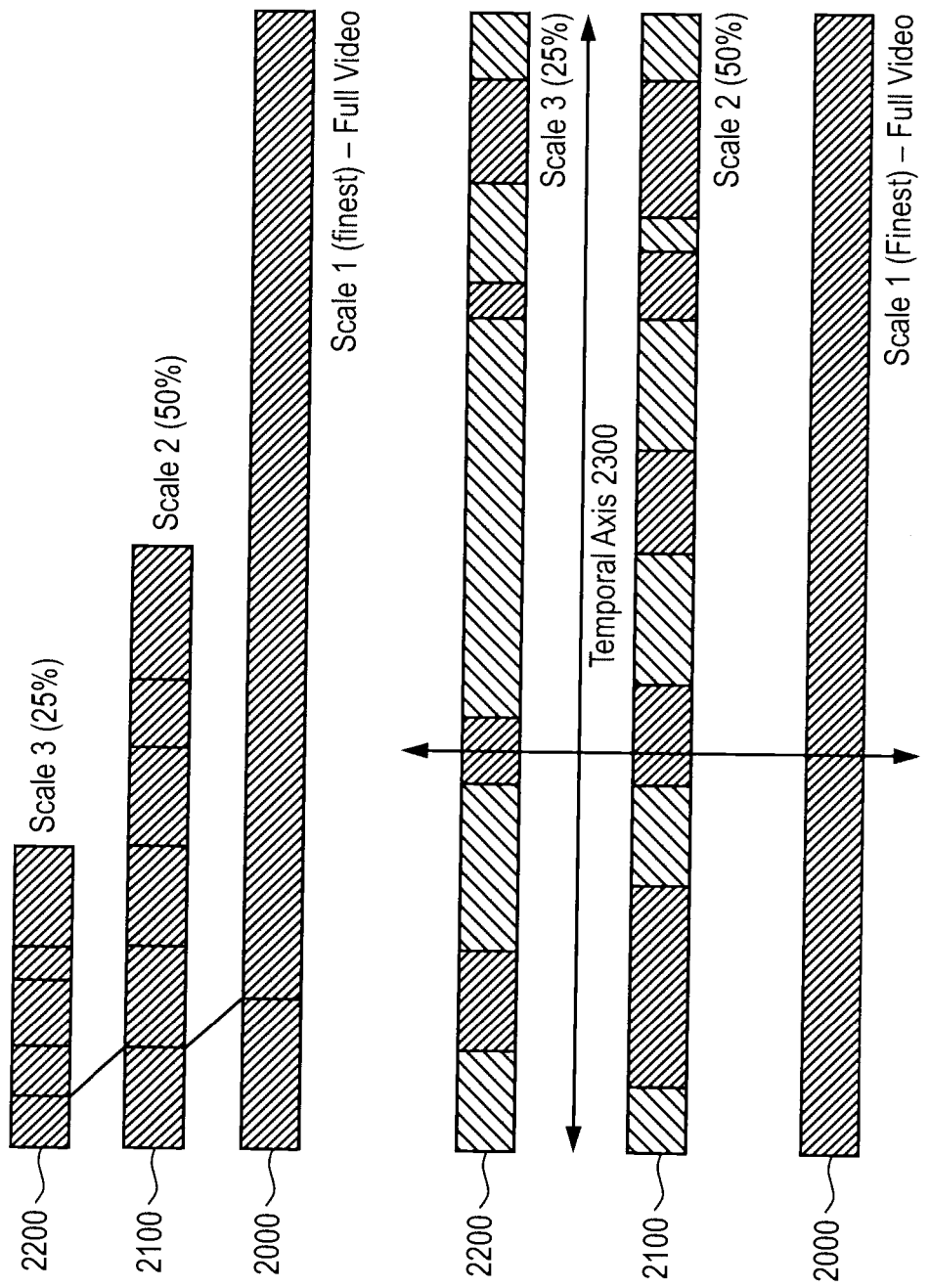
FIG. 17A illustrates the hierarchical structure of data used for video digest-guided navigation through video.

In one of the preferred embodiments of the invention, the temporal zooming is implemented by creating a multi-resolution hierarchical structure of frames. The information produced by the video digest generator is used to create multiple video digests of different length, each shorter video digest being a subset of the next longer one in the preferred embodiment. FIG. 17A shows a particular embodiment using a dyadic hierarchy, in which the finest scale is the full video 2000, the next coarser scale 2100 contains 50% of the full video, the third scale 2200 contains 25% of the full video, and so on.

The hierarchy of video digests is presented in a chronological manner, thus creating a scale-space with the temporal axis 2300 and resolution axis 2310. FIG. 17B depicts the possible control interface for the purpose of navigation, including the control to go up 2500 and down 2510 in resolution and back 2600 and forward 2610 in time. Since the hierarchy is constructed in such a way that the next coarser level is a subset of the previous one, there is a seamless transition from one level to another. Typically, the navigation will start from the coarsest scale (corresponding to the shortest video digest), and go down to finer resolution scales, as the user identifies a content of interest and wants to watch in more detail.

Another way of video navigation is spatial zooming, in which only part of the spatial information (frame) is displayed. This capability is supported in some of the DVRs, with control typically consisting of two group of buttons: magnification (zoom in and zoom out), controlling the size of the spatial region that is displayed, and pan (left, right, up and down), controlling its location in the spatial dimensions.

Video digest allows automatically zooming in on important parts of the video in a content-adaptive manner. In one of the preferred embodiments of the video digest, the video aggregates are created as spatio-temporal bounding boxes, which, when displayed, can act as content-adaptive spatial zooming. When a video aggregate is traversed during navigation, it is automatically scaled to the display size, thus automatically displaying part of the spatial information which is most relevant at the current moment of the video. This capability can be combined with conventional zoom controls (magnification and pan).

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

We claim:

1. A method of using a video digest generator device for automated generation of a metadata related to video content from at least a plurality of at least ten sequential frames, comprising the steps of:

inputting the plurality of sequential frames;

identifying a plurality of video elements from the sequential frames of the video content, each of the video elements including a spatio-temporal group of contiguous pixels spanning at least some of the plurality of sequential frames, wherein the spatio-temporal group of contiguous pixels includes 3 dimensions in which 2 dimensions are 2 spatial axes and 1 dimension is a temporal axis, and wherein the 2 spatial axes form a plane corresponding to a video frame, and the temporal axis corresponds to time over which different ones of the video frames occur; operating upon various ones of the video elements to obtain a plurality of video aggregates, each video aggregate including an aggregate spatio-temporal group of contiguous pixels spanning at least certain ones of the plurality of sequential frames, and wherein at least some of the video aggregates include more than one video element therein; and assigning a rating to each video aggregates, the step of assigning including, for certain ones of the video aggregates, calculating a similarity or a dissimilarity based upon a similarity algorithm or a dissimilarity algorithm, respectively, thereby obtaining the metadata related to the video content; and using said metadata to control, in conjunction with input from the user of a Digital Video Recorder or other device that displays video content, and/or factory default information, the operation of said Digital Video Recorder or other device that displays said video content.

2. A method according to claim 1 further including the steps of:

selecting a plurality of video aggregates from the metadata to obtain a digest of video content; and presenting the digest to an end user for visual display.

3. A method according to claim 2, wherein the step of selecting video aggregates includes the steps of arranging various ones of the video aggregates through a user interface to obtain the video digest.

4. A method according to claim 3, wherein the selected video aggregates are arranged to be displayed sequentially.

5. A method according to claim 3, wherein the user interface provides hyperlinks between video aggregates and their corresponding original video content.

6. A method according to claim 3, wherein the selected video aggregates are arranged to be displayed simultaneously.

7. A method according to claim 3 wherein the step of selecting includes the step of sorting each of the video aggregates according to their rating.

8. The method according to claim 2 wherein the video digest includes a plurality of frames, and further including the step of navigating through the plurality of frames using temporal zooming.

9. The method according to claim 8 wherein the temporal zooming includes the step of determining which video aggregates are unimportant based upon the rating.

10. The method according to claim 9 wherein the step of determining is further based upon a desired total time for the video digest.

11. The method according to claim 9 wherein the temporal zooming is user adjustable, based upon a user selection of a zoom up button and a zoom down button.

12. The method according to claim 2 wherein the video digest includes a plurality of frames, and further including the step of navigating through the plurality of frames using spatial zooming.

13. The method according to claim 12 wherein the spatial zooming is obtained by automatically rendering selected ones of the video aggregates to a display size.

14. The method according to claim 13 wherein the step of navigating further includes user adjustable magnification and panning of the automatically rendered selected ones of the video aggregates.

15. The method according to claim 2 wherein the video digest includes a plurality of frames, and further including the step of navigating through the plurality of frames using temporal zooming and spatial zooming.

16. The method according to claim 15 wherein the temporal zooming includes the step of determining which video aggregates are unimportant based upon the rating.

17. The method according to claim 16 wherein the step of determining is further based upon a desired total time for the video digest.

18. The method according to claim 15 wherein the temporal zooming is user adjustable, based upon a user selection of a zoom up button and a zoom down button.

19. The method according to claim 18 wherein the spatial zooming is obtained by automatically rendering selected ones of the video aggregates to a display size.

20. The method according to claim 19 wherein the step of navigating further includes user adjustable magnification and panning of the automatically rendered selected ones of the video aggregates.

21. A method according to claim 1, wherein the step of operating includes the step of defining each of the video aggregates as a three-dimensional rectangular block of pixels wherein each side of the three-dimensional block is parallel to one of the axes and wherein each three-dimensional rectangular block includes therein at least one corresponding video element.

22. A method according to claim 1, wherein a plurality of video elements are overlapping, and wherein the overlapping video elements, in the step of operating, form a single video aggregate.

23. A method according to claim 1, wherein a plurality of video elements are non-overlapping and wherein the non-overlapping video elements, in the step of operating, form distinct video aggregates.

24. A method according to claim 1, wherein the step of identifying the plurality of video elements includes identifying continuously appearing pre-defined objects in consecutive frames.

25. A method according to claim 24, wherein objects includes human faces, human body parts, nudity contents, texture patterns, and texts.

26. A method according to claim 1, wherein the step of identifying the plurality of video elements includes identifying rectangular three-dimensional blocks of pixels.

27. A method according to claim 26, wherein the rectangular three-dimensional blocks of pixels are overlapping.

28. A method according to claim 26, wherein the rectangular three-dimensional blocks of pixels are non-overlapping.

29. A method according to claim 1, wherein the step of identifying the plurality of video elements includes the step of detecting objects with properties known a priori.

30. A method according to claim 1, wherein the step of identifying the plurality of video elements includes the step of identifying three-dimensional irregularly-shapes regions of pixels utilizing edge detection.

31. A method according to claim 1, wherein the step of identifying the plurality of video elements includes the step of detecting an object with consistent motion.

32. A method according to claim 31, wherein the step of detecting an object with consistent motion include the step of utilizing motion vector information.

33. A method according to claim 31, wherein the step of detecting an object with consistent motion includes the step of occlusion detection.

34. A method according to claim 1, wherein the step of calculating a similarity or dissimilarity includes the step of applying the similarity algorithm or the dissimilarity algorithm to video elements that are contained in the video aggregate.

35. A method according to claim 34, wherein the applying of the similarity algorithm or the dissimilarity algorithm includes the step of comparing a video element to an example video element and returning quantified results.

36. A method according to claim 35, wherein the example video element includes at least one of a positive example and a negative example.

37. A method according to claim 36, wherein the example video elements are obtained from user interactions, from the video elements, or from predefined elements.

38. A method according to claim 37, wherein the user interactions are performed during preview of recorded or broadcast content.

39. A method according to claim 36, wherein positive example video elements are video elements to which a user devotes more time or attention.

40. A method according to claim 36, wherein negative example video elements are video elements being skipped or fast-forwarded by a user during preview.

41. A method according to claim 36, wherein each rating is proportional to negative example similarity distances and is inversely proportionate to positive example similarity distances.

42. A method according to claim 34, wherein the similarity algorithm or the dissimilarity algorithm uses at least one of a plurality of measures between video elements.

43. A method according to claim 42, wherein the at least one of the plurality of measures include earth moving distance (EMD), sum of absolute differences (SAD), and sum of squared differences (SSD).

44. A method according to claim 42, wherein the at least one of the plurality of measures is based on a comparison of motion vector histograms of video elements.

45. A method according to claim 42, wherein the at least one of the plurality of measures is based on comparison of pixel intensity histogram.

46. A method according to claim 42, wherein the at least one of the plurality of measures is based on comparison of pixel intensity histogram obtained in time and frequency domains.

47. A method according to claim 1, wherein the steps of identifying video elements and assigning are an iterative process to refine the identified video elements.

48. A method according to claim 1, wherein at least some of the video aggregates are provided in a format that can be displayed.

49. A method according to claim 48, wherein the at least some of the video aggregates are bounded by a spatio-temporal bounding box or a temporal bounding box.

50. A method according to claim 48, wherein a particular video aggregate contains one or a sequence of images that temporally occur before a particular video element corresponding thereto.

51. A method according to claim 50, wherein the particular video aggregate contains one or a sequence of images that temporally occur after the particular video element corresponding thereto.

52. A method according to claim 48, wherein each video aggregate is assigned a particular rating aggregated from the ratings of video elements contained therein.

53. A method according to claim 52, wherein the rating of one of the video aggregates is the sum over the ratings of video elements contained therein.

54. A method according to claim 52, wherein the rating of one of the video aggregates is the maximum over the ratings of video elements contained therein.

55. A method according to claim 52, wherein the rating of one of the video aggregates is the minimum over the ratings of video elements contained therein.

56. A method according to claim 52, wherein the rating of one of the video aggregates is the average of the ratings of video elements contained therein.

57. The method of claim 1, in which the video digest generator device is a combination of hardware and software constituting a component of a digital video recorder device.

58. A method using a video digest generator device for the presentation of a video digest of video content based upon predetermined metadata related to the video content, comprising the steps of:
providing the metadata, the metadata including a plurality of video aggregates each having a rating corresponding thereto, wherein each video aggregate includes an aggregate spatio-temporal group of contiguous pixels spanning at least certain ones of a plurality of sequential frames, wherein at least some of the video aggregates include more than one video element therein, each video element including a spatio-temporal group of contiguous pixels spanning at least some of the plurality of sequential frames, wherein the spatio-temporal group of contiguous pixels includes 3 dimensions in which 2 dimensions are 2 spatial axes and 1 dimension is a temporal axis, and wherein the 2 spatial axes form a plane corresponding to a video frame, and the temporal axis corresponds to time over which different ones of the video frames occur, and wherein the rating includes a calculated similarity or dissimilarity based upon a similarity algorithm or a dissimilarity algorithm; selecting from the metadata to obtain the digest of video content; and presenting the video digest to an end user for visual display;
wherein said end user is the user of a Digital Video Recorder or other device that displays video content;
and further using said metadata to control, in conjunction with either input from said end user, and/or factory default information, the operation of said Digital Video Recorder or other device that displays said video content.

59. A method according to claim 58, wherein the step of selecting includes the steps of sorting and arranging various ones of the video aggregates through a user interface to obtain the digest.

60. A method according to claim 59, wherein the video aggregates are arranged to be displayed sequentially.

61. A method according to claim 59, wherein the user interface provides hyperlinks between video aggregates and their corresponding original video content.

62. A method according to claim 59, wherein the video aggregates are arranged to be displayed simultaneously.

63. A method according to claim 59, wherein the step of selecting includes the step of sorting each of the video aggregates according to their rating.

64. The method according to claim 58 wherein the video digest includes a plurality of frames, and further including the step of navigating through the plurality of frames using temporal zooming.

65. The method according to claim 58 wherein the temporal zooming includes the step of determining which video aggregates are unimportant based upon the rating.

66. The method according to claim 65 wherein the step of determining is further based upon a desired total time for the video digest.

67. The method according to claim 65 wherein the temporal zooming is user adjustable, based upon a user selection of a zoom up button and a zoom down button.

68. The method according to claim 58 wherein the video digest includes a plurality of frames, and further including the step of navigating through the plurality of frames using spatial zooming.

69. The method according to claim 68 wherein the spatial zooming is obtained by automatically rendering selected ones of the video aggregates to a display size.

70. The method according to claim 69 wherein the step of navigating further includes user adjustable magnification and panning of the automatically rendered selected ones of the video aggregates.

71. The method according to claim 58 wherein the video digest includes a plurality of frames, and further including the step of navigating through the plurality of frames using temporal zooming and spatial zooming.

72. The method according to claim 71 wherein the temporal zooming includes the step of determining which video aggregates are unimportant based upon the rating.

73. The method according to claim 72 wherein the step of determining is further based upon a desired total time for the video digest.

74. The method according to claim 71 wherein the temporal zooming is user adjustable, based upon a user selection of a zoom up button and a zoom down button.

75. The method according to claim 74 wherein the spatial zooming is obtained by automatically rendering selected ones of the video aggregates to a display size.

76. The method according to claim 75 wherein the step of navigating further includes user adjustable magnification and panning of the automatically rendered selected ones of the video aggregates.

77. A method according to claim 58, further providing at least one audio stream that is synchronized with a plurality of sequential frames.

78. A method according to claim 77, wherein the at least one audio stream includes a sequence of sampled audio digital signals.

79. A method according to claim 78, further identifying a plurality of audio elements from the at least one audio stream, wherein each of the audio elements includes a block of sampled audio digital signals that is derived from the sequence of sampled audio digital signals.

80. A method according to claim 79, wherein the step of identifying the plurality of audio elements includes the step of detecting uniform blocks of sampled audio digital signals.

81. A method according to claim 79, wherein the step of identifying the plurality of audio elements includes the step of detecting pre-defined audio patterns in the sequence of sampled audio digital signals.

82. A method according to claim 81, wherein the audio patterns include shots, human speeches, words, and music.

83. A method according to claim 79, further operating upon various ones of the audio elements to obtain a plurality of audio aggregates.

84. A method according to claim 83, wherein at least one of a plurality of audio aggregates contains a continuous sequence of sampled audio digital signals around the block thereof.

85. A method according to claim 79, further assigning a rating to each audio element.

86. The method of claim 58, in which the video digest generator device is a combination of hardware and software constituting a component of a digital video recorder device.

\* \* \* \* \*